United States Patent
Furuya et al.

(10) Patent No.: US 8,050,302 B2
(45) Date of Patent: Nov. 1, 2011

(54) WAVELENGTH CONVERSION LASER LIGHT SOURCE, LASER LIGHT SOURCE DEVICE AND TWO-DIMENSIONAL IMAGE DISPLAY DEVICE ADOPTING THE SAME, AND METHOD OF SETTING TEMPERATURE OF WAVELENGTH CONVERSION ELEMENT

(75) Inventors: Hiroyuki Furuya, Osaka (JP); Shinichi Shikii, Nara (JP); Kazuhisa Yamamoto, Osaka (JP); Koichi Kusukame, Osaka (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 12/328,131

(22) Filed: Dec. 4, 2008

(65) Prior Publication Data
US 2009/0147811 A1 Jun. 11, 2009

(30) Foreign Application Priority Data

Dec. 7, 2007 (JP) ................................. 2007-316895
Mar. 11, 2008 (JP) ................................. 2008-060653

(51) Int. Cl.
*H01S 3/04* (2006.01)
*H01S 3/13* (2006.01)

(52) U.S. Cl. ............... 372/34; 372/35; 372/36; 372/21; 372/22; 372/29.014; 372/29.021; 359/326; 359/328; 359/329

(58) Field of Classification Search ............. 372/34–36, 372/21, 22, 29.014, 29.021; 359/326, 328, 359/329
See application file for complete search history.

(56) References Cited

U.S. PATENT DOCUMENTS

| | | | | |
|---|---|---|---|---|
| 7,733,927 | B2* | 6/2010 | Furuya et al. .................... | 372/21 |
| 7,848,010 | B2* | 12/2010 | Furuya et al. .................. | 359/326 |
| 2006/0039423 | A1* | 2/2006 | Tokuhisa et al. ................ | 372/22 |
| 2007/0025401 | A1* | 2/2007 | Hayashi et al. .................. | 372/22 |
| 2008/0013574 | A1* | 1/2008 | Furuya et al. ..................... | 372/6 |
| 2009/0154509 | A1* | 6/2009 | Suzuki et al. ................... | 372/22 |
| 2009/0323172 | A1* | 12/2009 | Furuya et al. .................. | 359/326 |
| 2010/0008388 | A1* | 1/2010 | Yokoyama et al. ............. | 372/32 |
| 2010/0110533 | A1* | 5/2010 | Kusukame et al. ........... | 359/326 |
| 2010/0208758 | A1* | 8/2010 | Kamijima ........................ | 372/34 |

FOREIGN PATENT DOCUMENTS

| | | |
|---|---|---|
| JP | 2000-305120 | 11/2000 |
| JP | 2004-157217 | 6/2004 |

* cited by examiner

*Primary Examiner* — Jessica Stultz
*Assistant Examiner* — Delma R Forde
(74) *Attorney, Agent, or Firm* — Wenderoth, Lind & Ponack, L.L.P.

(57) ABSTRACT

A wavelength conversion laser light source includes: an element temperature switching section that switches a temperature of the wavelength conversion element according to a harmonic wave output value as set in an output setting device, and the element temperature switching section for switching a temperature of a wavelength conversion element according to a harmonic wave output level as set in the output setting device, wherein the element temperature switch section includes an element temperature holding section that holds the wavelength conversion element at the temperature as switched by the element temperature switching section.

9 Claims, 26 Drawing Sheets

ELEMENT TEMP: LOW

ELEMENT TEMP: PHASE MATCHING TEMP.

ELEMENT TEMP: HIGH

FIG.24A
FIG.24B
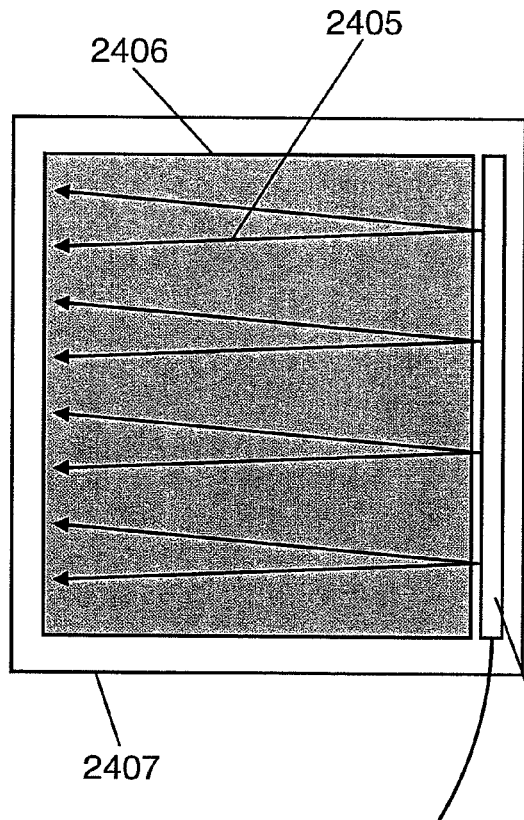
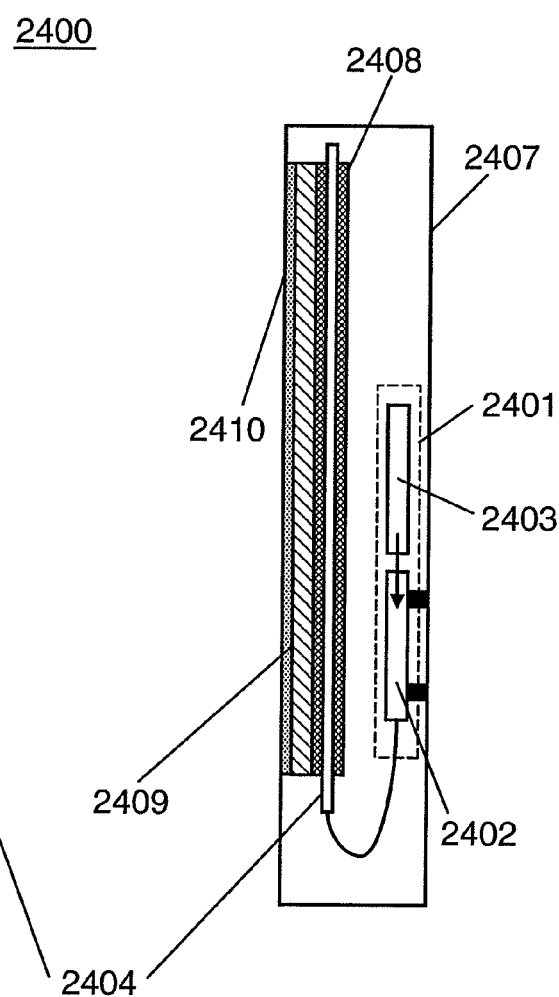
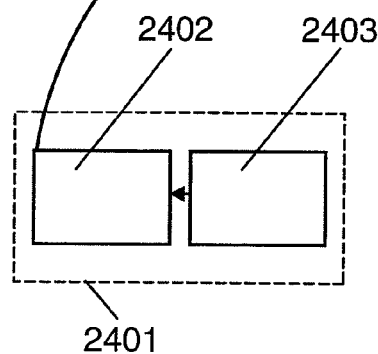

WAVELENGTH CONVERSION LASER LIGHT SOURCE, LASER LIGHT SOURCE DEVICE AND TWO-DIMENSIONAL IMAGE DISPLAY DEVICE ADOPTING THE SAME, AND METHOD OF SETTING TEMPERATURE OF WAVELENGTH CONVERSION ELEMENT

This application is based on Japanese patent application serial No. 2007-316895, filed in Japan Patent Office on Dec. 7, 2007, and Japanese patent application serial No. 2008-060653, filed in Japan Patent Office on Mar. 11, 2008, the contents of which are hereby incorporated by reference.

BACKGROUND OF THE INVENTION

1. Field of the Invention

The preset invention relates to a wavelength conversion laser light source for converting a laser beam emitted from a laser light source using the non-linear optical effects, and to a laser light source device and a two-dimensional image display device adopting the same, and also relates to the method of setting temperature of a wavelength conversion element provided in the wavelength conversion light source.

2. Description of the Background Art

Conventionally, a variety of wavelength conversion laser light sources have been developed and made into practical applications, wherein a visible laser beam is obtained, such as a green light or an ultraviolet ray which is obtained by further converting the green light, etc., through the wavelength conversion using the non-linear optical effects of a laser beam emitted from the Nd:YAG laser, or the Nd:YVO$_4$ laser, for example, as disclosed in Japanese unexamined Patent Publication No. 2004/157217 and Japanese unexamined Patent Publication No. 2000/305120. These converted light beams are used for laser processing, or a laser display, etc.

FIG. 1 shows a typical structure of a conventional wavelength conversion laser light source using the non-linear optical effect. In order to obtain the non-linear optical effect, it is required to adopt the non-linear optical crystals having the birefringence. Examples of such non-linear optical crystals having the birefringence include: LiB$_3$O$_5$ (LBO:lithium triborate), KTiOPO$_4$ (KTP:Potassium Titanyl Phosphate), CsLiB$_6$O$_{10}$(CLBO:Cesium Lithium Borate); or LiNbO$_3$ (PPLN:Lithium Tantalate), and LiTaO$_3$(PPLT:Lithium Tantalate) having a periodical polarization inversion structure, etc.

As shown in FIG. 1, a wavelength conversion laser light source 100 includes a fundamental wave light source 101, a collective lens 108, a non-linear optical crystals (wavelength conversion element) 109, a re-collimating lens 111, a wavelength-dividing mirror, a temperature holder 116 such as a heater or the like for holding the temperature of the non-linear optical crystals constat, a control unit 115 for controlling a laser output, and a temperature controller 122 for controlling the temperature of the non-linear optical crystals provided in the control unit 115. For the fundamental wave light source 101, Nd:YAG laser, Nd:YVO$_4$ laser, fiber laser using Yb doped fiber having a wavelength of 1.06 µm are generally used.

Here, the actual operations will be explained, which generate the second harmonic wave having a wavelength of 0.532 µm which is around ½ of wavelength (1.06 µm) of the fundamental wave.

The laser beam having a wavelength of 1.06 µm as emitted from the fundamental wave light source 101 is converged into the non-linear optical crystals 109 by the collective lens 108.

Here, the non-linear optical crystals 109 needs to have the refractive index for the light having the wavelength of 1.06 µm matched with the refractive index for the light having the wavelength of 0.532 µm to be generated (phase matching condition). Generally, the refractive index for the crystals varies according to temperature conditions of the crystals. Therefore, the temperature of the crystals needs to be maintained constant. For this reasons, the non-linear optical crystals are placed in the temperature holder 116, and are maintained at a predetermined temperature suited for the kind of the crystals. For example, when adopting the LBO crystals, in order to obtain the type-1 non-critical phase matching (the phase matching state), the LBO crystals need to be maintained at a temperature in a range of from 148° C. to 150° C.

On the other hand, when adopting LiNbO$_3$ crystals having a periodical polarization inversion structure, it is possible to determine the temperature and the wavelength for the phase matching condition by selecting the period for the periodical polarization inversion structure. However, in order to maintain the phase matching condition, it is required to keep the element temperature of the wavelength of the fundamental wave constant.

However, it has been found that for some kinds of the non-linear optical crystals to be adopted as the wavelength conversion element, the temperature of the element is raised by absorbing the fundamental wave and the harmonic wave as generated, which makes the phase matching temperature (wavelength) vary according to the output level of the harmonic wave, thereby presenting a problem in that a high conversion efficiency cannot be realized.

SUMMARY OF THE INVENTION

An object of the present invention is to provide a wavelength conversion laser light source, a laser light source device and a two-dimensional image display device adopting the same, and a method of setting the temperature of a wavelength conversion element of the wavelength conversion laser light source, which permit an efficient conversion irrespectively of changes in phase matching condition of the wavelength conversion element according to an output level of the harmonic wave.

As described, a wavelength conversion laser light source, according to one aspect of the present invention includes: a fundamental wave laser light source; a wavelength conversion element for converting a fundamental wave emitted from the fundamental wave laser light source into a harmonic wave, the wavelength conversion element being made of a material whose light absorption properties change according to an output level of a harmonic wave; an output setting section for setting a harmonic wave output power level; and an element temperature switching section that switches a temperature of the wavelength conversion element according to a harmonic wave output level as set in the output setting device, wherein the element temperature switch section includes an element temperature holding section which holds the wavelength conversion element at the temperature as switched by the element temperature switching section.

According to the foregoing structure wherein the wavelength conversion element made of a material whose light absorption properties change according to an output level of a harmonic wave, the phase matching temperature of the wavelength conversion element changes according to an output level of the harmonic wave. In response to changes in phase matching temperature of the wavelength conversion element according to the output level of the harmonic wave, the element temperature switching section switches the element temperature of the wavelength conversion element according to the output level of the harmonic wave, and the element temperature holding section holds the wavelength conversion element at the element temperature as switched. As a result, it is possible to realize the wavelength conversion laser light source, which permits an efficient conversion without being adversely affected by changes in phase matching condition of the wavelength conversion element according to the output level of the harmonic wave.

Furthermore, the wavelength conversion element can be maintained at a desirable temperature corresponding to the output level of the harmonic wave, thereby realizing a high wavelength conversion efficiently.

These and other objects, features and advantages of the present invention will become more apparent upon reading the following detailed description along with the accompanying drawings.

BRIEF DESCRIPTION OF THE DRAWINGS

FIG. 24A is an explanatory view schematically showing an example structure of a liquid crystal display adopting a laser light source of the present invention;

FIG. 24B is a cross-sectional view of the liquid crystal display of FIG. 24A;

DETAILED DESCRIPTION OF THE PREFERRED EMBODIMENTS OF THE INVENTION

Hereinafter, embodiments of the present invention will be described with reference to the drawings.

In the first through third embodiments, a method of obtaining the temperature of the wavelength conversion element and setting the element temperature at a predetermined temperature value will be explained. In the fourth embodiment, a method of determining a timing of re-setting the temperature of the wavelength conversion element at an optimal temperature in consideration of changes in temperature of the wavelength conversion element as time passes, and a method of making fine adjustments on the temperature of the wavelength conversion element.

First Embodiment

The following descriptions will explain a wavelength conversion laser light source in accordance with one embodiment of the present invention with reference to figures.

In the present embodiment, the method of switching a temperature at which a wavelength conversion element 209 is held according to a fundamental wave power level with which a harmonic wave of the output power level as set in an output setting device 201 can be obtained.

Figure 1:
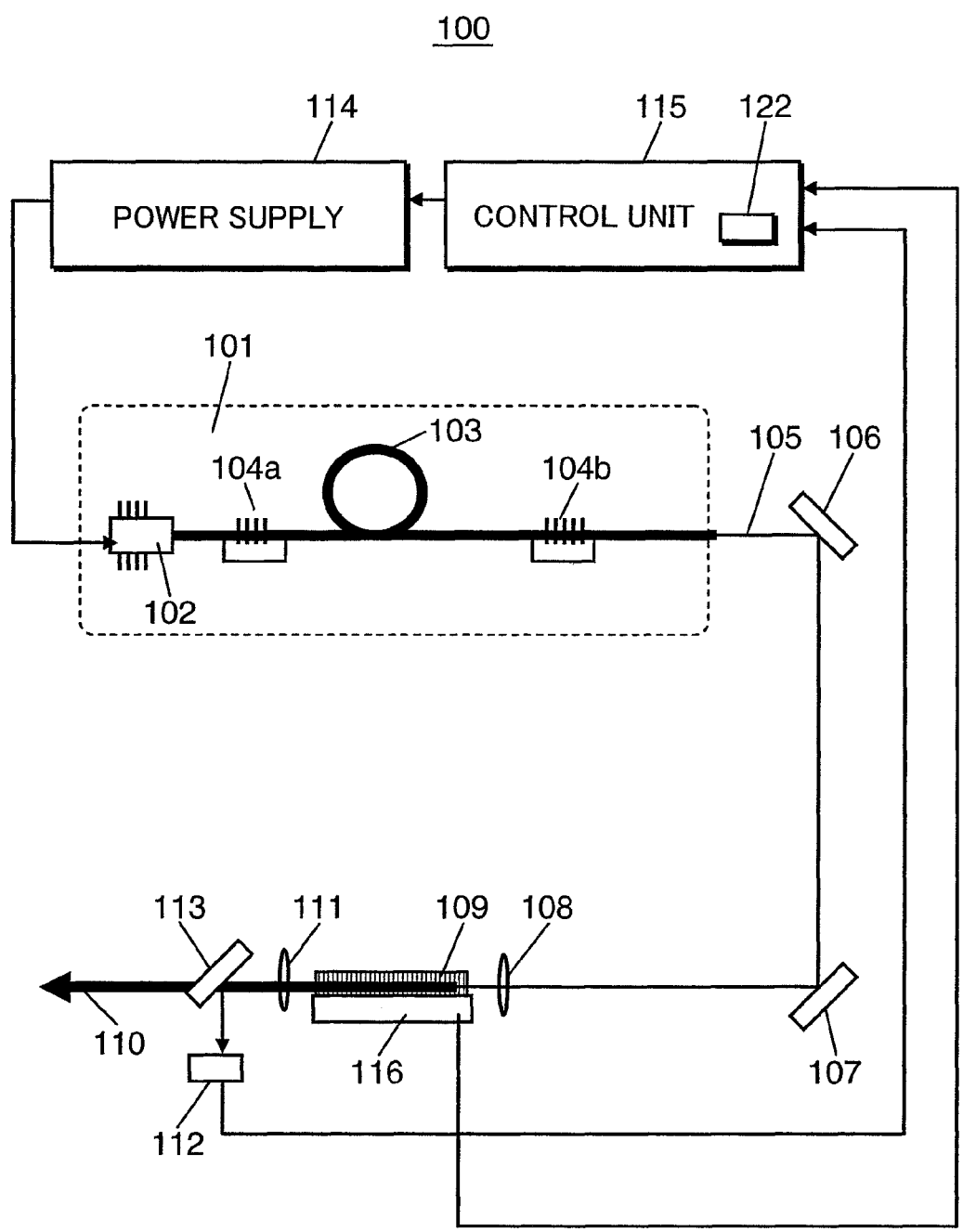
FIG. 1 is an explanatory view schematically showing the structure of a conventional wavelength conversion laser light source.
Figure 2:
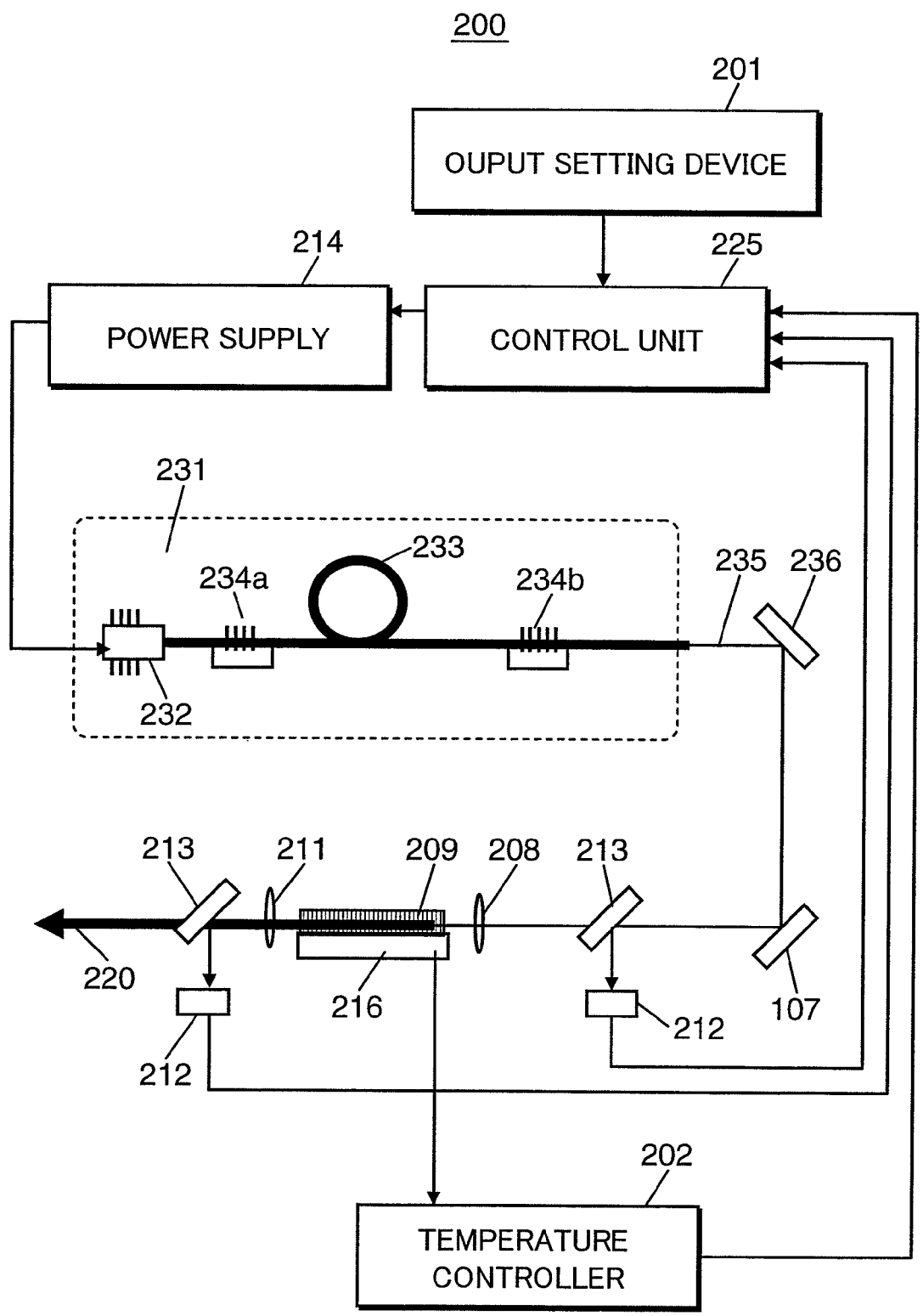
FIG. 2 is an explanatory view schematically showing the structure of a wavelength conversion laser light source in accordance with one embodiment of the present invention.

As shown in FIG. 2, a wavelength conversion laser light source 200 in accordance with the present embodiment includes a fundamental wave light source 231, a first dichroic mirror 236, a second dichroic mirror 237, a collective lens 208, a non-linear optical crystals (wavelength conversion element) 209, a re-collimating lens 211, a photoreceptor (photodiode) 212, a beamsplitter 213, etc.

For the fundamental wave light source 231, adopted is a fiber laser light source adopting a Yb doped fiber 233. It is advantageous to adopt a fiber laser light source in that the oscillation wavelength and the spectrum width can be determined as desired. Therefore, when adopting such fiber laser light source, it is possible to significantly improve the conversion efficiency from a fundamental wave into a harmonic wave by reducing the spectrum width.

The fundamental wave 235 generated by the fundamental wave light source (fiber laser light source) 231 is collected into the non-linear optical crystals (wavelength conversion element) 209 by the collective lens 208. In the present embodiment, MgO:LiNbO$_3$ crystal element (MgLN element) is adopted as the non-linear optical crystals, wherein the periodical polarization inversion structure is formed.

The wavelength conversion laser light source 200 in accordance with the present embodiment is provided with the temperature holder 216 under the lower surface of the wavelength conversion element (non-linear optical crystals) 209. This temperature holder 216 serves to maintain the wavelength conversion element 209 at a predetermined holding temperature. For the temperature holder 216, adopted is a Peltier device.

The second harmonic wave having wavelength converted by the wavelength conversion element 209 is formed into a parallel beam by the re-collimating lens 211. After having formed into the parallel beam, the beam is separated by the beamsplitter 213 into a fundamental wave which has not been converted to the harmonic wave, and the harmonic wave as being converted.

The laser output is controlled with current supplied to the pump light source of the fundamental wave light source 231. Incidentally, such method of controlling the fundamental wave input may be adopted, wherein a part of the fundamental wave may be taken out directly before the fundamental wave is incident into the wavelength conversion element 209, to monitor the incident light into the wavelength conversion element 209.

In the structure of FIG. 2, a beam splitter 213 and a photoreceptor (photodiode) 212 are provided before and after the wavelength conversion element 209. However, it may be arranged so as to provide the beam splitter 213 and the photoreceptor 212 either before or after the wavelength conversion element 209.

Figure 3:
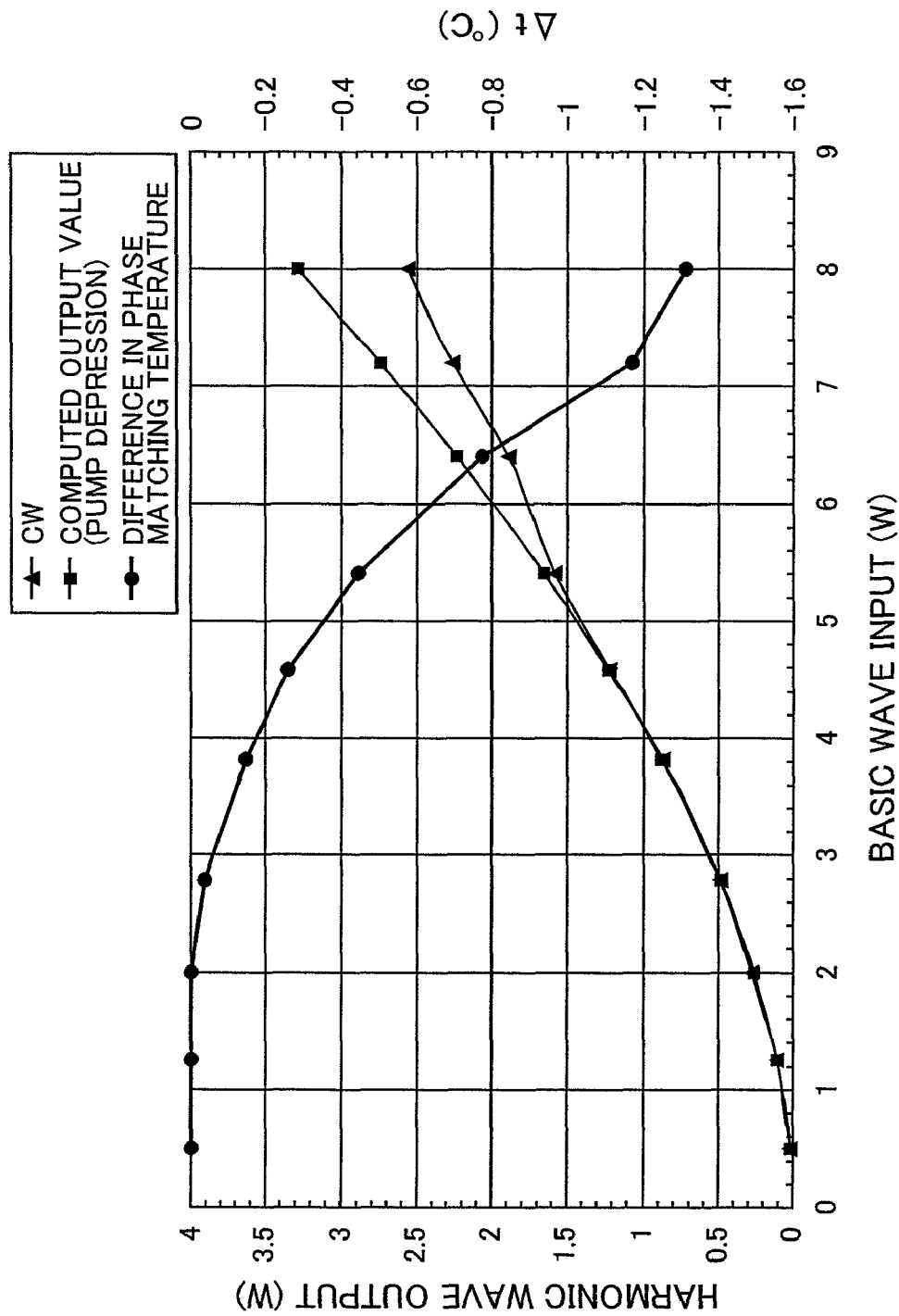
FIG. 3 is a graph showing the relationship between the fundamental wave input and the second harmonic wave output, and the relationship between the fundamental wave input and a shift in temperature from a phase matching temperature of a wavelength conversion element when adopting the wavelength conversion laser light source in accordance with one embodiment of the present invention.

FIG. 3 is a graph showing the relationship between the fundamental wave input and the second harmonic wave output, and the relationship between the fundamental wave input and a shift in temperature Δt(° C.) from a phase matching temperature T(° C.) of the wavelength conversion element 209 with a power of the input fundamental wave of 500 mW when adopting the wavelength conversion laser light source 200 in accordance with the present embodiment.

As is clear from the graph of FIG. 3, as the second harmonic wave output increases, the phase matching temperature becomes lower. When the output power for the second harmonic wave is increased to 2.5 W, the phase matching temperature is reduced from the temperature initial value by 1.3 (° C.).

Figure 4:
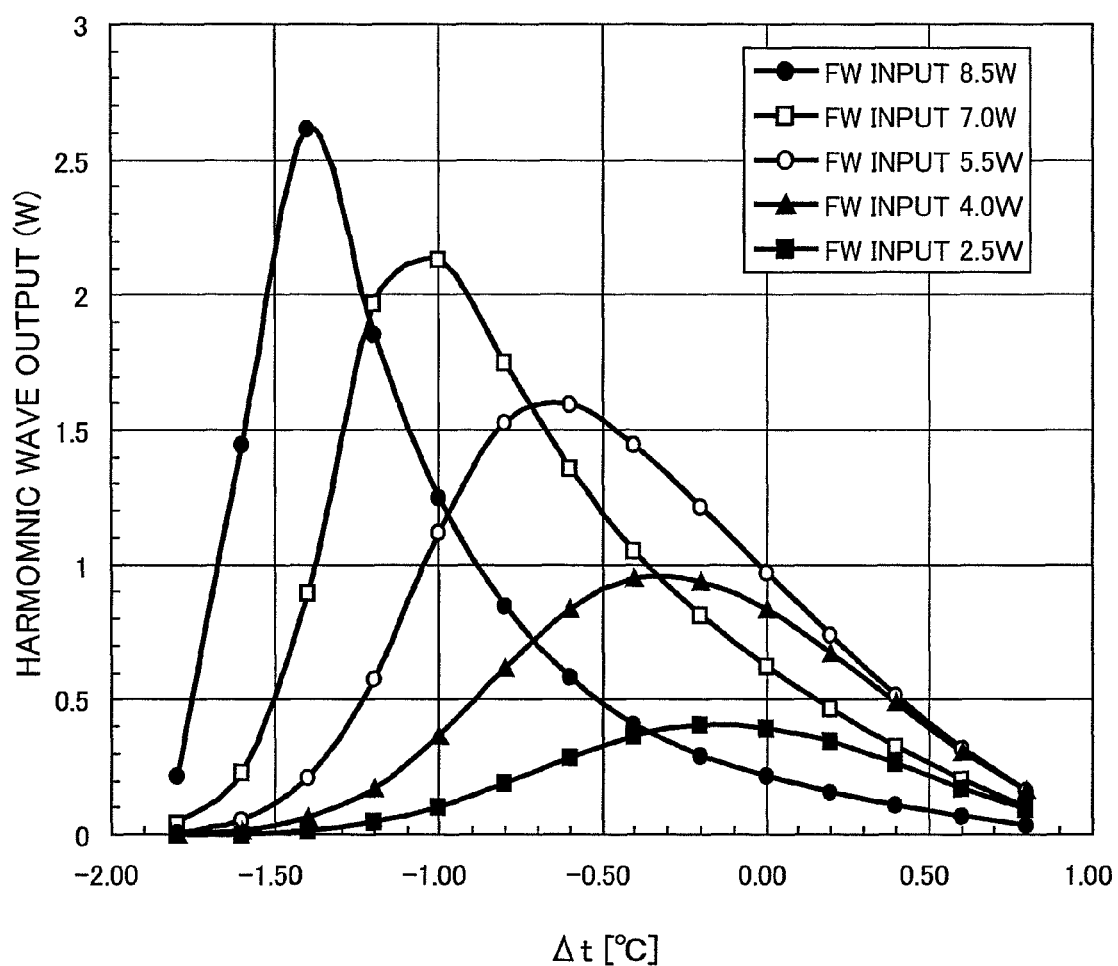
FIG. 4 is a graph showing the relationship between the second harmonic wave output and a shift in temperature from a phase matching temperature of a wavelength conversion element with a parameter of fundamental wave input when adopting the wavelength conversion laser light source in accordance with one embodiment of the present invention.

FIG. 4 is a graph showing the relationship between the second harmonic wave output (W) and a shift in temperature Δt(° C.) from a phase matching temperature T(° C.) of the wavelength conversion element 209 with a parameter of fundamental wave input of 500 mW.

As is clear from the graph of FIG. 4, the peak value of the curve, i.e., a shift in temperature Δt from the phase matching temperature T(° C.) of the wavelength conversion element 209 is shifted to the lower temperature side as the output power level for the second harmonic wave (W) is increased as in case of the graph of FIG. 3.

Figure 5:
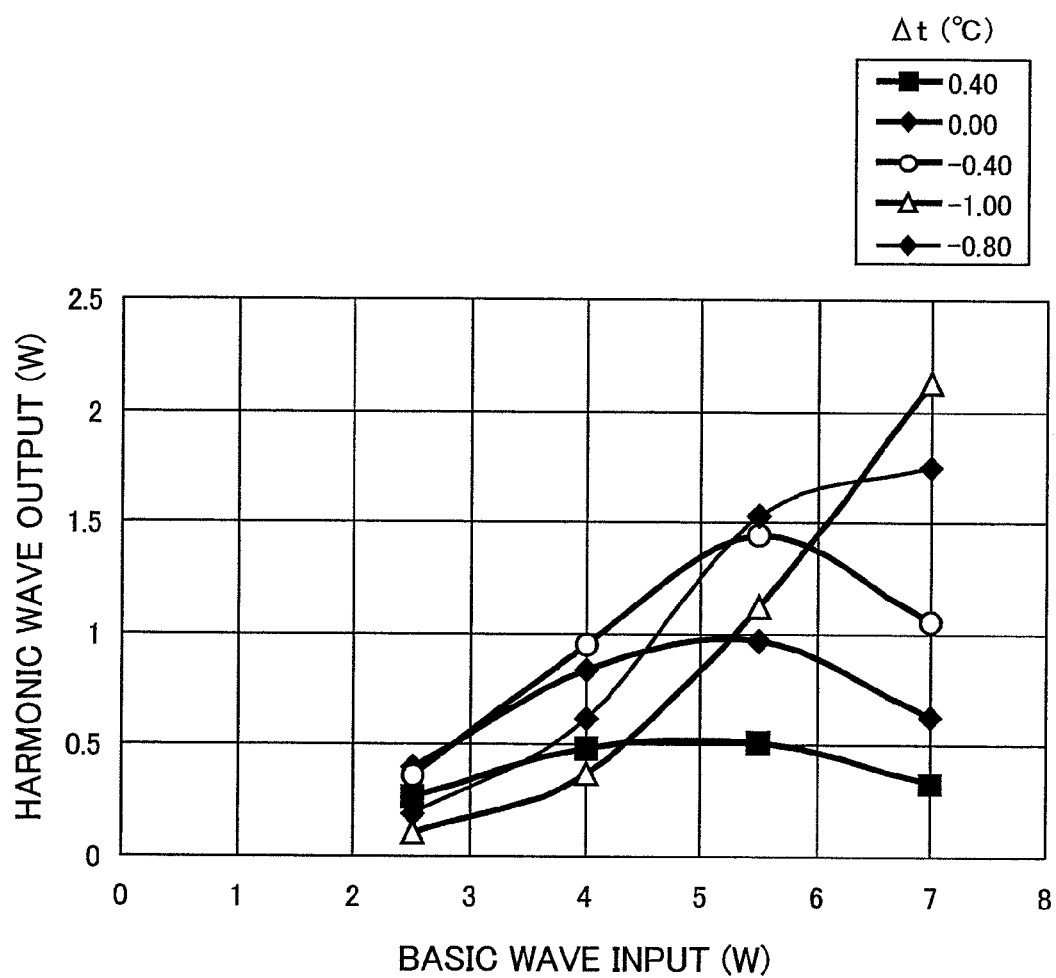
FIG. 5 is a graph showing the relationship between the fundamental wave input and the second harmonic wave output with a parameter of a shift in temperature from a phase matching temperature of a wavelength conversion element when adopting the wavelength conversion laser light source in accordance with one embodiment of the present invention.

FIG. 5 is a graph showing the relationship between the fundamental wave input and the second harmonic wave output with a parameter of a shift in temperature Δt from a phase matching temperature T(° C.) of the wavelength conversion element 209 with a power of the input fundamental wave of 500 mW. As can be seen from the graph of FIG. 5, in some holding temperature range for the wavelength conversion element 209, the output power of the harmonic wave is increased as the power of the fundamental wave increases. However, in other holding temperature ranges, the output power of the harmonic wave is decreased as the power of the fundamental wave increased from a certain point for the input power of the fundamental wave. Specifically, when a shift in temperature Δt(° C.) from the phase matching temperature T(° C.) of the wavelength conversion element 209 with a power of the input fundamental wave of 500 mW is Δt(° C.)=−1.0(° C.), the output power for the harmonic wave is exponentially increases with an increase in the input power for the fundamental wave. On the other hand, when a shift in temperature Δt(° C.) from the phase matching temperature T(° C.) of the wavelength conversion element 209 with a power of the input fundamental wave of 500 mW is Δt(° C.)=0 (° C.), the output power for the harmonic does not increase with an increase in the input power for the fundamental wave with a boundary of the output power of the second harmonic wave of 5.5 W. When adopting the laser light source, it is general to control the output power from the light source to be constant (Auto Power Control: APC).

When carrying out the auto power control, an increase or a decrease in output power of the light source should correspond to increase or decrease in current applied. However, it has being found by the inventors of the present application that a decrease in output power of the second harmonic wave raises the problem not only in that an efficient conversion cannot be performed but also in that the output power for the second harmonic wave cannot be increased with an increase in input power of the fundamental wave under the auto power control, namely, the output power cannot be controlled.

It was found by the inventors of the present application that such problem of a decrease in output power is outstanding when adopting non-linear optical crystals having light absorbing properties such as $Mg:LiNbO_3$, $Mg:LiTaO_3$, $KTiOPO_4$, two-photon absorption in particular which is excited by a laser beam.

In response, the output power for the harmonic wave may be adjusted as desired by adjusting temperature the wavelength conversion element 209. However, when adopting the non-linear optical crystals as the wavelength conversion element 209, under some conditions, the wavelength conversion element 209 absorbs in an excess amount of harmonic wave output at the moment the phase matching state is realized. Further, heat generated from the wavelength conversion element by absorbing the harmonic wave output, may result in the problem of damage in wavelength conversion crystals.

In view of the foregoing problems, the present and subsequent embodiments will discuss the method of preventing an occurrence of such event that the output power of the harmonic wave becomes out of control due to the properties of absorbing light of the wavelength conversion element 209.

Figure 6:
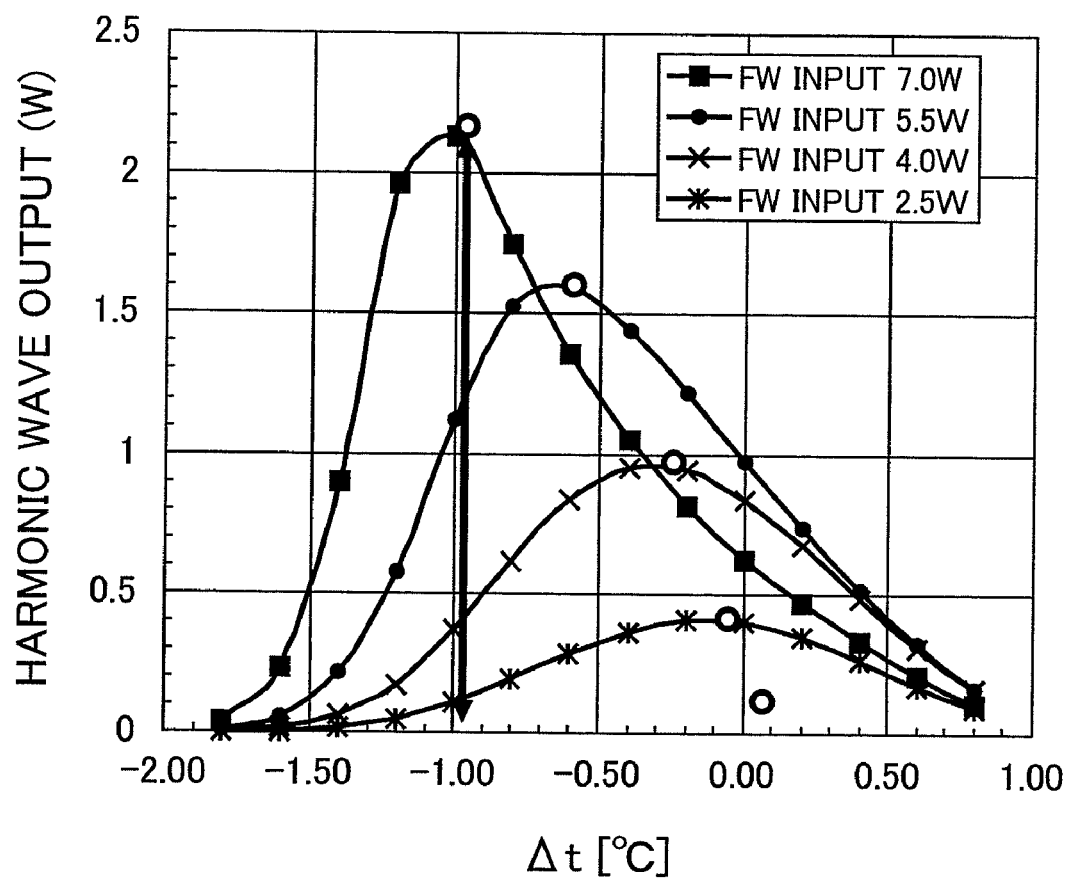
FIG. 6 is a graph showing the relationship between a shift in temperature from a phase matching temperature of a wavelength conversion element and a second harmonic wave output with a parameter of fundamental wave input when adopting the wavelength conversion laser light source in accordance with one embodiment of the present invention.

The graph of FIG. 6 shows the relationship between a shift in temperature Δt(° C.) from the phase matching temperature T(° C.) of the wavelength conversion element 209 with a power of the input fundamental wave of 500 mW and an output power of the second harmonic wave with a parameter of fundamental wave input.

According to the method of the present embodiment, a peak search is carried out to obtain a temperature of the wavelength conversion element 209 at which the output power for the harmonic wave is maximized according to a difference in input power of the fundamental wave. Then, the resulting optimal temperature of the wavelength conversion element 209 is stored in the EEPROM (ELECTRICALLY ERASABLE PROGRAMMABLE READ-ONLY MEMORY) 706. The optimal temperature as stored in the EEPROM 706 is read to be switched from the currently set temperature of the wavelength conversion element 209 when next setting the output power for the output setting device 201.

The respective cases with different change points with output powers of 1 W, 1.6 W, and 2.2 W (corresponding to input power of the fundamental wave of 4 W, 5.5 W and 7.0 W) will be explained with reference to FIG. 6.

Firstly, the information indicative of that the output powers 1 W, 1.6 W and 2.2 W of the second harmonic wave correspond to input powers 4 W, 5.5 W and 7.0 W of the fundamental wave respectively, and the information indicative of that respective temperatures of the wavelength conversion element 209 corresponding to the output level (1 W, 1.6 W and 2.2 W) of the second harmonic wave are A ° C., B ° C. and C ° C. are recorded in the EEPROM 706 when shipping from the factories, in the form of input current to the fundamental wave light source 231.

When inputting X(W) in the output setting device 201 as a desired output power for the second harmonic wave, the temperature of the wavelength conversion element 209 is set under the following conditions.

x<1:A ° C.

1≦X<1.6:B ° C.

1.6≦X<2.2:C ° C.

2.2≦X:temperature is not set and re-input is required.

When the holding temperature of the wavelength conversion element 209 is being changed to a desired output power as inputted, a caution signal is outputted to inform the user that the temperature is being adjusted. When the wavelength conversion element 209 is reached to the holding temperature as set, it is set in a stand-by state to be ready for the output of a harmonic wave laser.

In response to an instruction from the output setting device 201, a harmonic wave is outputted from the wavelength conversion laser light source 202.

Here, while the harmonic wave is being emitted, a change in target temperature of the wavelength conversion element 209 may be required in response to a change in set output power of the harmonic wave by the output setting device 201. In this case, based on the output power value of the harmonic wave as re-set, the target temperature of the wavelength conversion element 209 is changed under the above conditions. In this case, to avoid fluctuations in harmonic wave output while the temperature is being adjusted, the auto power control is performed by adjusting a current applied to the pump LD, to reduce functions in output power.

According to the present embodiment, when the target output power cannot be changed by controlling the current applied to the pump LD, a caution signal is outputted from the control unit 225 to inform the user that the target output power is being changed.

Figure 7:
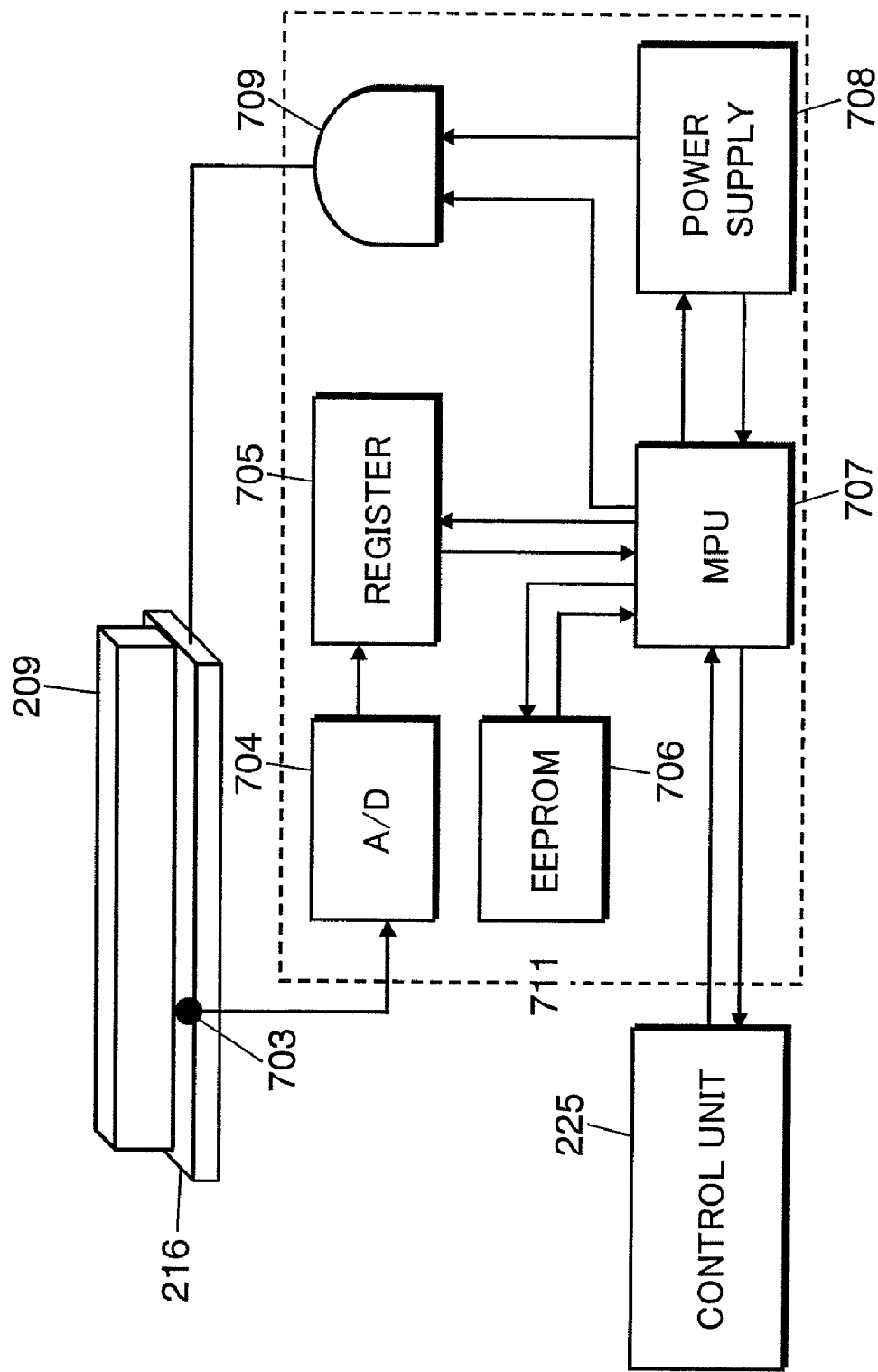
FIG. 7 is a block diagram showing schematic structures of a control unit and a temperature controller of a wavelength conversion element provided with a wavelength conversion laser light source in accordance with one embodiment of the present invention.

FIG. 7 is a block diagram showing schematic structures of the control unit 255 and the temperature controller 711 of the wavelength conversion element 209 provided with the wavelength conversion laser light source in accordance with the present embodiment.

As shown in FIG. 7, the temperature controller 711 includes a power supply 708, a thermistor 703, an A/D converter 704 for converting a temperature signal from the thermistor 703 into a digital value, a register 705 storing a temp. signal as converted into a digital value by the A/D converter 704, EEPROM 706 for storing a table of temperatures of the wavelength conversion element 209 corresponding to respective output powers of the harmonic wave and current required, an MPU 707 to which the data indicative of a set value for the output power of the harmonic wave from the control unit 225 is transferred from the control unit 225, and a switch 709 which controls the PWM (Pulse Width Modulation) with respect to the current wavefrom to be supplied to the temperature holder 216 from the power supply 708.

In the present embodiment, the temperature holder 216 is controlled in the following manner. That is, the information indicative of the temperature of the wavelength conversion element 209 corresponding to the output level (output power level) of the harmonic wave as stored in the EEPROM 706 is obtained. Then, the MPU 707 compares and computes the temperature of the wavelength conversion element 209 as obtained with the temperature present value stored in the register 705. As a result, the temperature holder 216 is controlled based on the current to be applied to the temperature holder 216 from the power supply 708 in view of the polarity and the waveform of the current under the PWM (Pulse Width Modulation) control by giving instructions to the switch 709.

The wavelength conversion element 209 is placed on the temperature holder 216, and the temperature of the wavelength conversion element 209 is monitored indirectly by monitoring the temperature of the temperature holder 216. The temperature signal from the thermistor 703 is converted into a digital value by the A/D converter 704 to be stored in the register 705. The temperature signal from the thermistor 703 is converted into a digital value by the A/D converter 704 to be stored in the register 705. In the EEPROM 706, stored beforehand together with input currents is a table for the temperatures of the wavelength conversion element, which respectively correspond to the output powers of the harmonic wave. The set value for the output power for the harmonic wave is transferred from the control unit 225 to the MPU 707. Then, the element temperature corresponding to the set value for the output power as transferred is obtained from the EEPROM 706. The MPU 707 compares and computes the element temperature thus obtained with respect to the element temperature present value stored in the register 705. As a result, the temperature holder 216 is controlled based on the current to be applied to the temperature holder 216 from the power supply 708 in view of the polarity and the waveform of the current under the PWM (Pulse Width Modulation) control by giving instructions to the switch 709.

Figure 8:
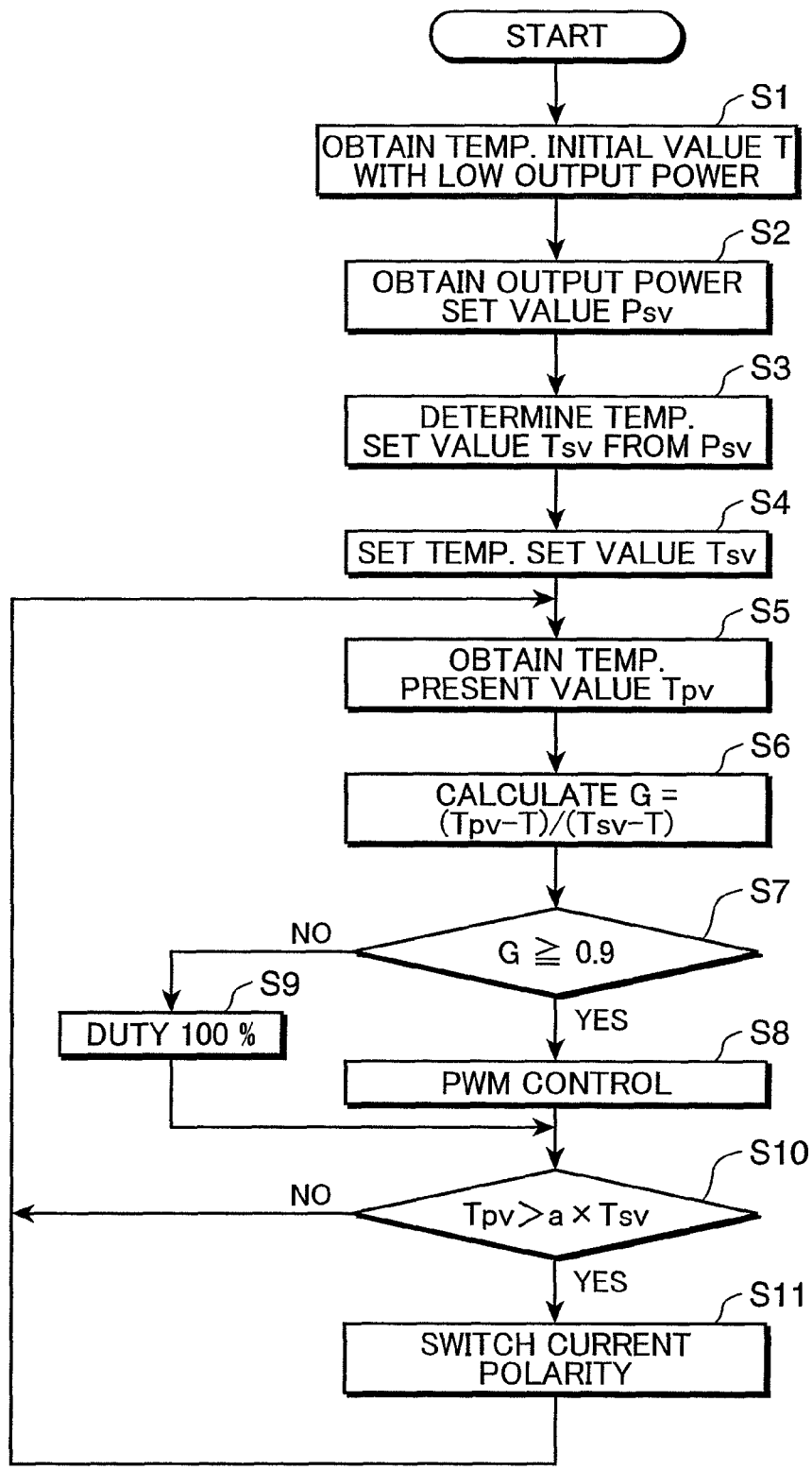
FIG. 8 is a flowchart showing processes of controlling a wavelength conversion element by a temperature controller in accordance with one embodiment of the present invention in normal state.
Figure 9:
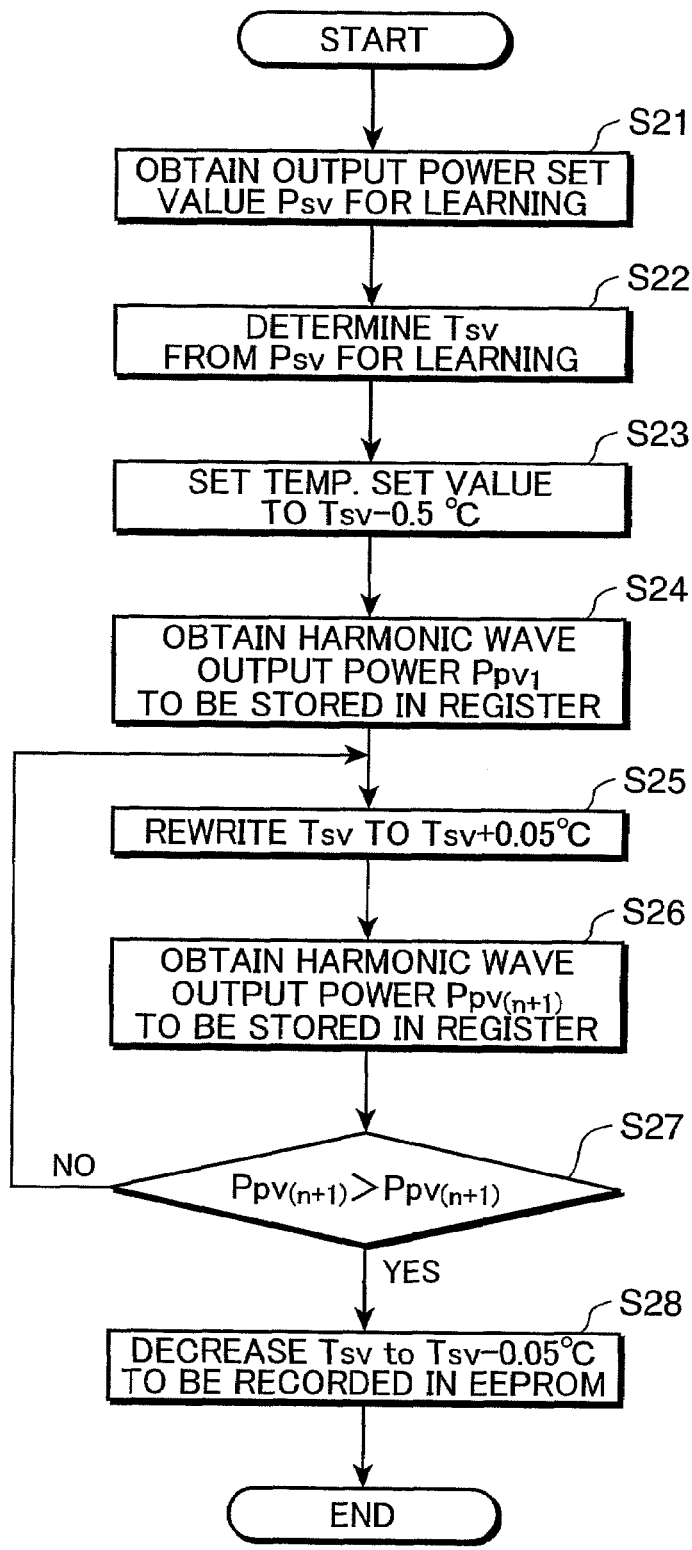
FIG. 9 is a flowchart showing processes of controlling a wavelength conversion element by a temperature controller when executing the element temperature learning processes in accordance with still another embodiment of the present invention.

FIG. 8 is a flowchart showing processes of controlling a wavelength conversion element by a temperature controller in normal state in accordance with the present embodiment. FIG. 9 is a flowchart showing processes of controlling a wavelength conversion element by a temperature controller when executing the element temperature learning processes in accordance with the present embodiment.

When starting the normal driving, the temperature initial value T of the temperature holder 216 for the wavelength conversion element 209 is obtained (S1). Then, the output power set value Psv as set in the output setting device 201 is obtained from the control unit 225 (S2). Based on the set Psv, the Tsv is obtained from the EEPROM 706 (S3), to be set as the target element temperature (S4). Before starting the temperature control, the temperature present value Tpv of the wavelength conversion element 209 is obtained from the thermistor 703 (S5). Then, the polarity of current to be applied to the temperature holder 216 (in the case of adopting the Peltier device as the temperature holder 216) and the waveform are subjected to control.

Then, a coefficient G is computed for use in controlling the current waveform based on the temperature initial value T, the temperature set value Tsv and the temperature present value Tpv (S6).

$$G=(Tpv-T)/(Tsv-T) \quad (1)$$

In the present embodiment, the duty ratio is switched based on the coefficient G thus computed in S6 to control the current waveform.

When the condition of $0.9 \leq G$ is satisfied (YES in S7), the PWM control is performed (S8). On the other hand, when the condition of $0.9 \leq G$ is not satisfied (NO in S7), the duty ratio is set to 100%, and the PWM control is not performed (S9).

In replace of the foregoing structure of switching the duty ratio based on the coefficient G, it may be arranged so as to directly use the computed value from the equation of the current duty ratio for controlling temperature=$b*(1-G)/(b+G)$ using the coefficient G and the coefficient b ($0<b\leq 1$).

Next, it is then determined if a change in current polarity is required by the following inequality (2) using Tpv, Tsv and a coefficient a (S10).

$$Tpv>a \times Tsv \quad (2)$$

When the above inequality (2) holds (YES in S10), the polarity of current is changed (S11). On the other hand, when the condition of $0.9 \leq G$ is not satisfied is not satisfied (NO in S7), it is determined if the above inequality (2) holds without performing the PWM control in S8 (S10).

The coefficient a in the inequality (2) is adopted for preventing the polarity of the current to be switched to the normal state frequently. It is preferable that the coefficient a falls in a range of from 1.1 to 1.2.

Incidentally, when Tpv is in a range of 1.1 Tsv to 1.2 Tsv, the current may be cut to reduce the temperature of the wavelength conversion element 209 by natural cooling.

After the polarity of current changes in S11, the sequence goes back to S5 where the current temperature value of the wavelength conversion element 209 is obtained (S5). By repeating the foregoing processes, a green light can be outputted under stable condition.

Next, the processes for controlling the wavelength conversion element by a temperature controller will be explained in reference to the flowchart of FIG. 9. In the present embodiment, the temperature learning processes refer to the processes of re-setting the target holding temperature of the wavelength conversion element to an optimal temperature for the desired output power of the harmonic wave, as such target holding temperature is subjected to change as time passes.

Upon starting the element temperature learning processes, first the output power set value Psv for leaning is obtained from the EEPROM 706 (S21). The temperature set value Tsv is determined based on the output power set value Psv for learning (S22). For the element temperature learning processes of the wavelength conversion element 209, a phase matching temperature of the wavelength conversion element 209 is searched based on peak hold by scanning temperatures. Therefore, the initial temperature set value is set to 0.5 (° C.) below Tsv (S23).

Subsequently, the harmonic wave is actually generated to obtain the harmonic wave output $Ppv_1$, to be stored in the register 705 (S24). The temperature set value Tsv is then increased by 0.05 (° C.) to be replaced with the currently set temperature (S25).

Next, the harmonic wave output $Ppv_{(n+1)}$ of the nth loop is obtained to be temporarily stored in the register 705 (S26). The harmonic wave output $Ppv_{(n+1)}$ is compared with the harmonic wave output $Ppv_n$ (S27).

$$Ppv_n > Ppv_{(n+1)} \tag{3}$$

When the above inequality (3) does not hold (NO in S27), the temperature set value Tsv is increased again by 0.05 (° C.) to be replaced with the currently set temperature repetitively. On the other hand, if the above inequality (3) holds (YES in S27), the sequence goes out of the loop and, the temperature set value Tsv is then reduced by 0.05 (° C.) to be stored in the EEPROM 706 as an optimal temperature value (S28), thereby terminating the foregoing element temperature learning processes.

In the foregoing element temperature leaning processes, the initial temperature set value is set to 0.5 (° C.) below Tsv. However, how many degrees to be decreased from the Tsv is to be determined based on the tolerance range for temperatures (temperature range at which the output level is ½) of the wavelength conversion element 209, i.e., half width at half maximum, HWHM from the peak to the ½ of the output level.

Here, in order to prevent the misreading of the sub-peak in the temperature tuning curve of the harmonic wave output as the peak, it is desirable that a drop in temperature be set to 0.5 to 1 times of the tolerance range for the temperature Δt of the wavelength conversion element 209.

As shown in the graph of FIG. 5, up to the range for the harmonic wave of 1.0 W, the harmonic wave output increases monotonically with respect to the fundamental wave input. On the other hand, in the range for the harmonic wave above 1.0 W, a problem arises in that the auto power control cannot be performed at the temperature of the wavelength conversion element set to the phase matching temperature if the temperature of the wavelength conversion element is subjected to change due to some disturbances as shown in the graph of FIG. 5. When generating the harmonic wave with output power above 1.0 W, it is therefore desirable to set the target temperature to 0.2° C. below the phase matching temperature as obtained from the peak search.

In the case of adopting the periodically poled MgLN element of 25 mm in length as a wavelength conversion element 209, and converting collecting the light at the center of the element in the confocal condition, it is desirable to set the target temperature below the phase matching temperature by 0.3 (° C.) to 0.05 (° C.) for the following reason: That is, the temperature tuning curve is shifted to the lower temperature side with respect to the fundamental wave input (FIG. 4). Namely, if the target temperature is set to the phase matching temperature, the output power for the harmonic wave cannot be increased with an increase in input power of the fundamental wave. It is therefore effective to shift beforehand the target temperature to the low temperature side.

Here, how many degrees to be decreased from the phase matching temperature should vary according to various factors such as the length of the wavelength conversion element 209, the tolerance range for temperatures, focal conditions of the fundamental wave (beam waist diameter, focal position). Specifically, the temperature set value can be shifted to a lower temperature side from the phase matching temperature, for example, by increasing the length of the wavelength conversion element 209, increasing the beam diameter, or moving the focal position of the fundamental wave closer to the light incident surface of the element.

Incidentally, a timing at which the element temperature leaning processes are to be executed may be set automatically, for example, by the following method. That is, directly before and after driving the device, the capacity left to the upper limit current to be applied to the pump LD is detected and recorded in the EEPROM 706.

For example, the element temperature learning processes may be carried out when the following equation (4) is satisfied.

$$I_1 \times (1+d/100) = I_{lim} \tag{4}$$

In the equation (4), $I_1$ indicates the required LD current for obtaining the output $P_1$, d (%) is a margin left to the limit value $I_{lim}$ to be applied to the pump LD and the auto power control.

Here, a program may be set to instruct a computer to automatically carry out the temperature learning processes when it is determined that the element temperature learning processes are to be carried out while informing the user of that the device is being in the element temperature learning processes. Alternatively, it may be arranged such that the user operates the device to execute the temperature learning processes in response to a caution to do so.

In any case, the device cannot be used while the temperature learning processes are being executed. It is therefore desirable that the information indicative of being in the processes of learning temperature is displayed using the operation panel, and that the device is set in a locked state except for the case where the user needs to operate to shut down the device to execute an automatic emergency shutdown system.

Second Embodiment

The following descriptions will explain another embodiment of the present invention with reference to figures.

In the present embodiment, a peak search is to be executed for an optimal temperature of a wavelength conversion element 209 for output powers set to 10% to 20% above the output power that can be set in the output setting device 201. Namely, in the present embodiment, explanations will be given through the case of using the results of search performed in the entire range for output powers.

The basic structures for the laser light sources with fiber in accordance with the present embodiment and the subsequent embodiments to be explained later are the same as that of the first embodiment. In the present and subsequent embodiments, explanations will be given mainly on the characteristic structures for each embodiment, and explanations on the members having the same structures and the functions shall be omitted by designating the same reference numerals for convenience for explanations.

In the present embodiment, the required harmonic wave output value is set to 2.2 W, and the peak search is to be carried out for the output power of the harmonic wave of 2.6 W, which is approximately 1.2 times of the required output power (2.2 W).

Figure 10:
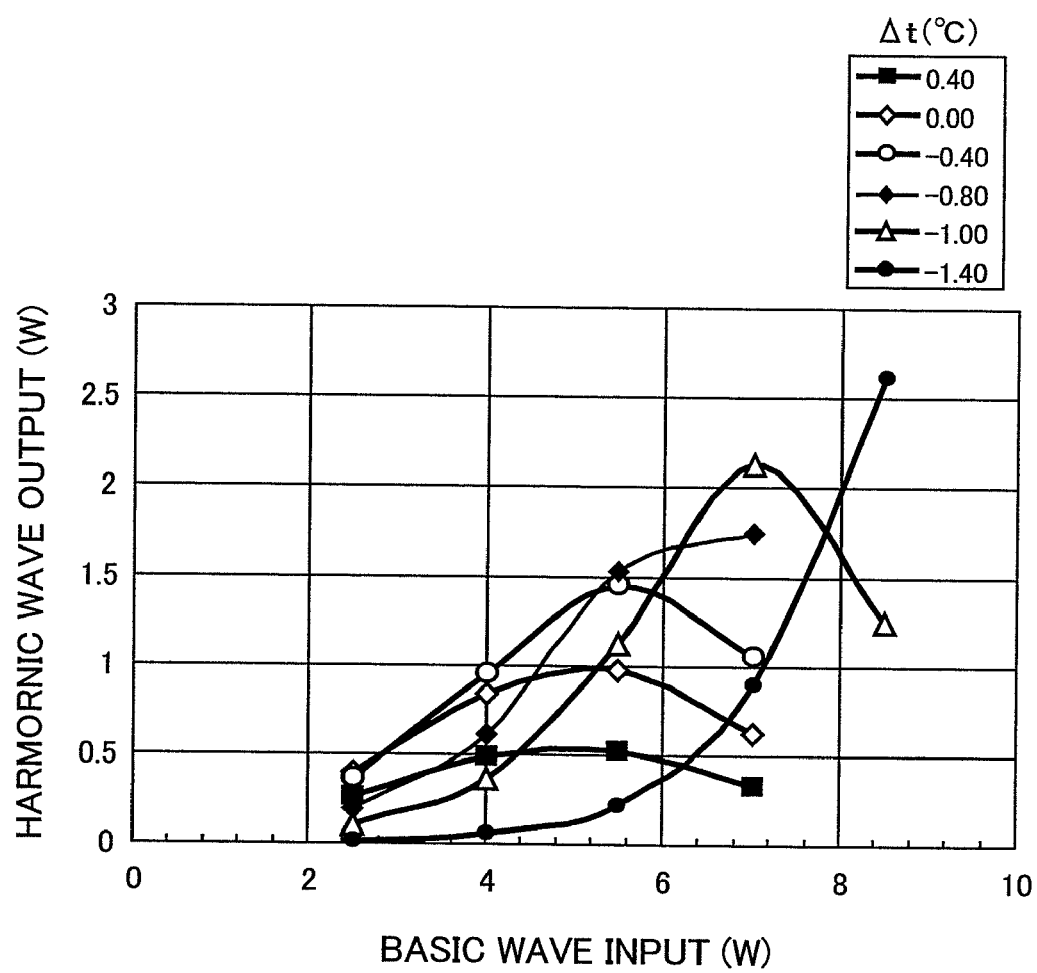
FIG. 10 is a graph showing the relationship between the fundamental wave input and the second harmonic wave output with a parameter of a shift in temperature from a phase matching temperature of a wavelength conversion element in accordance with one embodiment of the present invention.

FIG. 10 is a graph showing the relationship between the fundamental wave input and the second harmonic wave output (w) with a parameter of a shift in temperature Δt(° C.) from a phase matching temperature T(° C.) of a wavelength conversion element 209 with a power of the input fundamental wave of 500 mW.

In the present embodiment, the harmonic wave with the output power of 2.6 W could be obtained with Δt=−1.4 (° C.) by carrying out a peak search with the input fundamental wave power of 8.5 W. Then, the temperature of the wavelength conversion element 209, i.e., T-1.4° C. is recorded in the EEPROM 706, and it is controlled to adjust the temperature of the wavelength conversion element 209 at T-1.4° C. when driving the device.

With an increase in input power of the fundamental wave, the output power of the harmonic wave can be increased monotonically with respect to the fundamental wave input in the output power of the harmonic wave range of 0 W to 2.6 W. Then, the harmonic wave output can be controlled with the auto power control based on the current to be applied to the pump LD. Here, by setting the output power of the harmonic wave, for example, to 2.2 W, when actually driving the device, it is possible to maintain the output power to the desired level with the auto power control only by increasing the input power of the fundamental wave in view of changes in environment. In this case, although it is not shown in the graph of FIG. 10, it is appropriate to set the output power of the harmonic wave to 2.2 W when actually driving the device including the control margin, i.e., the output power that can be set in the output setting device 201 in view of the fact that the output power of the harmonic wave will be saturated at above the output power of the harmonic wave of 2.6 W.

Figure 11:
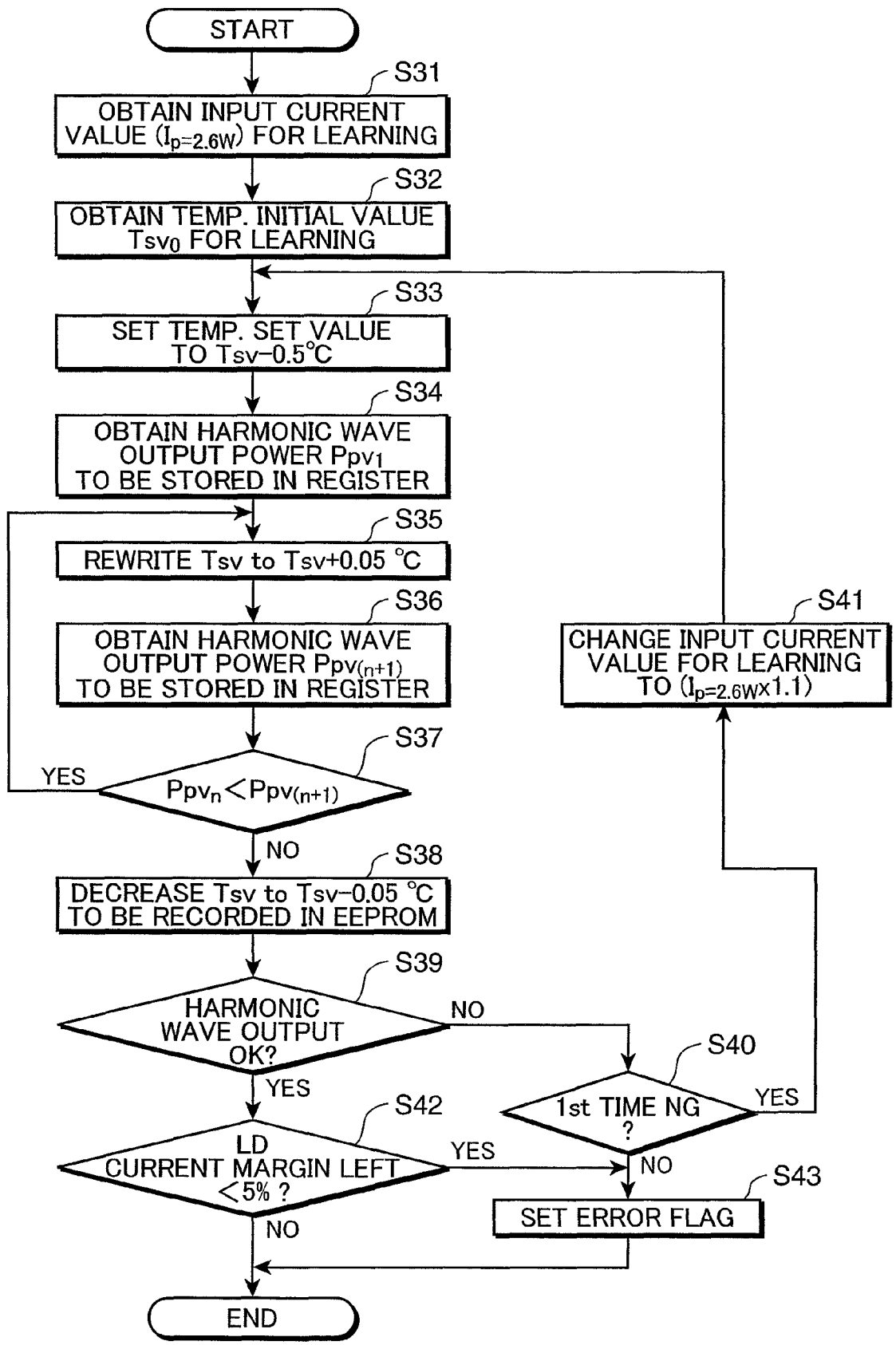
FIG. 11 is a flowchart showing processes of controlling a wavelength conversion element by a temperature controller in accordance with one embodiment of the present invention when executing the element temperature learning processes.

Next, the processes for learning the temperature of the wavelength conversion element 209 will be explained to FIG. 11. FIG. 11 is a flowchart showing processes of controlling a wavelength conversion element when executing the element temperature learning processes.

In the present embodiment, the current $I_{p=2.6W}$ required for obtaining the harmonic wave with the output power of 2.6 W is recorded in the EEPROM 706 (FIG. 7) together with the initial temperature for the wavelength conversion element 209. Upon starting the element temperature learning processes, first, the current $I_{p=2.6W}$ for learning required for obtaining the harmonic wave with the output power of 2.6 W is obtained from the EEPROM 706 (S31). In the meantime, the initial temperature ($Tsv_0$) for learning is obtained from the EEPROM 706 (S32). Then, the scanning of temperatures is carried out with the temperature set value of the wavelength conversion element 209, which is set to 0.5 (° C.) below $Tsv_0$ (S33). Thereafter, the harmonic wave output $Tsv_1$ is actually generated, to be stored in the register 705 (S34).

Then, the temperature set value Tsv is then increased by 0.05 (° C.) to be replaced with the currently set temperature (S35).

Next, the harmonic wave output $Ppv_{(n+1)}$ of the nth loop is obtained to be temporarily registered in the register 705 (S36). The harmonic wave output $Ppv_{(n+1)}$ is compared with the harmonic wave output Ppvn (S37). If the following inequality (5) is satisfied (YES in S37), the temperature set value Tsv is increased again by 0.05 (° C.) to be replaced with the currently set temperature repetitively.

$$Ppv_n < Ppv_{(n+1)} \qquad (5).$$

On the other hand, when the above inequality does not hold (NO in S37), the temperature set value Tsv is then reduced by 0.05 (° C.) to be stored in the EEPROM 706 as an optimal temperature value (S38), thereby terminating the foregoing element temperature learning processes. Next, it is checked if a harmonic wave with an output power of 2.6 W is obtained (S39).

As a result of check in S39, if the output power is equal to or larger than 2.6 W, the sequence is terminated via the S42 where it is checked if the margin for the upper limit current is not more than 5% (S42). This is because the output power can be adjusted by reducing the input power (YES in S39 and NO in S42). On the other hand, if the output power of the harmonic wave is smaller than 2.6 W (NO in S39 and NO in S40), the input power is increased by 10% to perform the temperature scanning again (S41). If the target output power level of the harmonic wave still cannot be obtained after performing the re-scanning of the temperature, an error flag is outputted (S43), and the driving of the device is stopped. On the other hand, if the target output power level of the harmonic wave is obtained after carrying out the re-scanning, it is determined if the margin left for the upper limit current is less than 5% (S42). If it is determined that the margin left is less than 5%, an error flag is outputted (S43).

Upon completing the processes for learning the holding temperature of the wavelength conversion element 209, the processes of controlling the wavelength conversion element 209 by the temperature controller 202 in normal state shown in the flowchart of FIG. 8 are to be executed.

Figure 12:
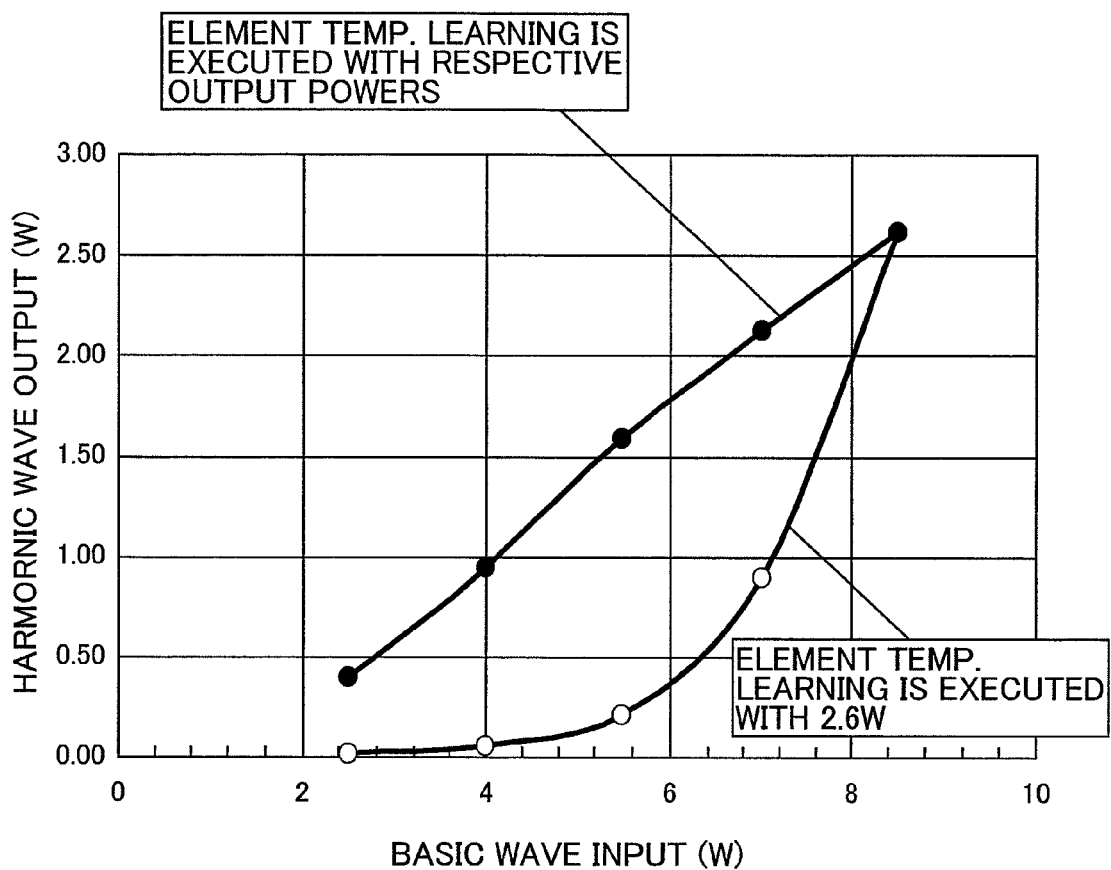
FIG. 12 is a graph showing differences in conversion efficiency from a fundamental wave to a harmonic wave between when adopting a temperature leaning method in accordance with one embodiment of the present invention and when adopting a temperature leaning method in accordance with another embodiment of the present invention.

FIG. 12 is a graph showing differences in conversion efficiency between the case wherein temperature learning processes are executed with an optimal holding temperature set for each output power level (first embodiment) and the case wherein temperature learning processes are executed with an optimal holding temperature set for an upper limit output power level (present embodiment).

As can be seen from the graph of FIG. 12, when adopting the temperature learning processes in accordance with the present embodiment, the target output power level of the harmonic wave was not able to be obtained with the input power of the fundamental wave of less than 5 W. On the other hand, when executing the temperature learning processes with an optimal holding temperature set for each output power level as in the first embodiment, the harmonic wave of the output power of 1 W or higher is obtained with the input power of the fundamental wave of 5 W.

As explained, the element temperature learning method in accordance with the present embodiment is disadvantageous in that the conversion efficiency is lowered as compared to the case of adopting the method of the first embodiment. On the other hand, the element temperature learning method is advantageous in that the time required for learning can be reduced as compared to the case of adopting the method of the first embodiment wherein the element temperature is obtained for each output power of the harmonic wave.

Additionally, the foregoing method of setting the element temperature in accordance with the present embodiment is also advantageous in the following point. That is, the output power of the second harmonic wave is saturated even when the input power of the fundamental wave is increased. It is therefore possible to prevent the wavelength conversion element from being damaged due to an increase in light absorption ratio in proportion to the power of the second harmonic wave generated by absorbing the second harmonic wave, two-photon absorption in particular.

Third Embodiment

The following descriptions will explain still another embodiment of the present invention with reference to figures.

In the present embodiment, a peak search is to be executed for an optimal temperature of the wavelength conversion element 209 for output powers set to some hundreds mW which is lower than that of the second embodiment. By reducing the element temperature according to the fundamental wave as inputted, such problem can be avoided when carrying out the auto power control. That is, the output power cannot be controlled with an increase in input fundamental wave.

Figure 13:
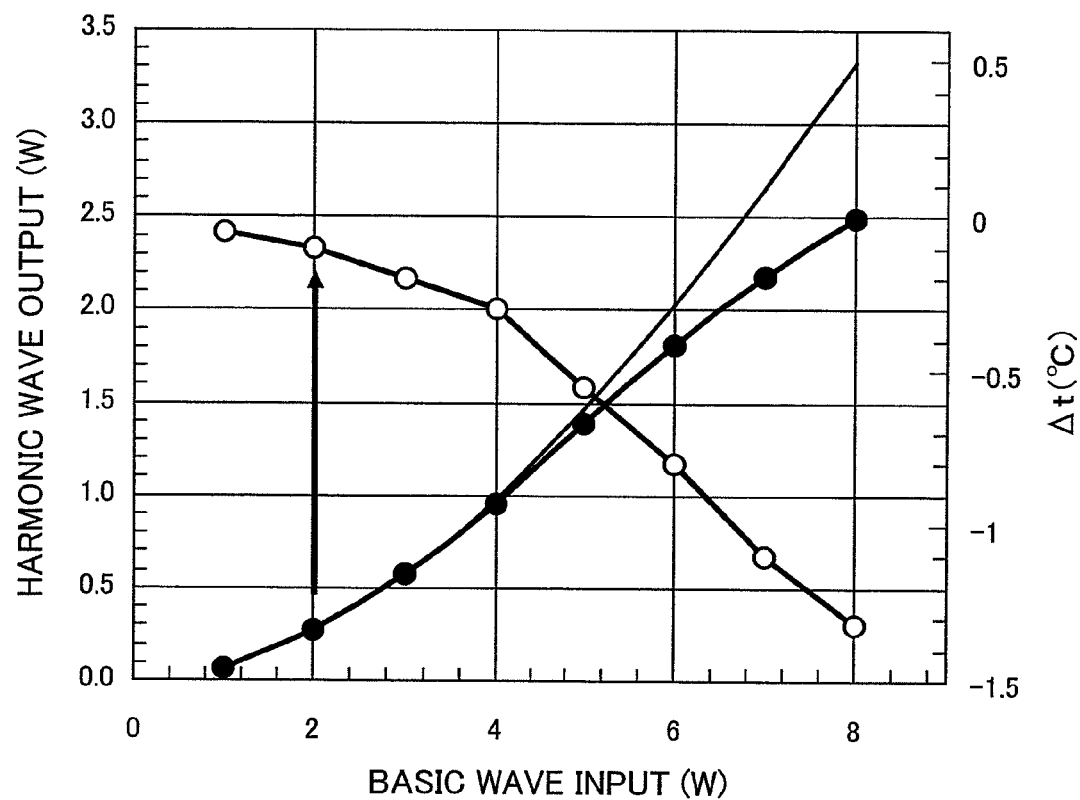
FIG. 13 is a graph showing the relationship between a shift in temperature from a phase matching temperature of a wavelength conversion element and a second harmonic wave output generated at optimal element temperature with respect to the fundamental wave input in accordance with still another embodiment of the present invention.

The graph of FIG. 13 shows the relationship between the optimal temperature of the wavelength conversion element (shift in temperature from the phase matching temperature) and the second harmonic wave output generated at the optimal element temperature with respect to the fundamental wave input.

Specifically, as shown in the graph of FIG. 13, the optimal element temperature (reference element temperature) is learned with a fundamental wave with an input power of 2 W is set as the reference fundamental wave. A shift in temperature from the reference element temperature corresponding to the fundamental wave different from the reference fundamental wave is recorded in the EEPROM 706. In this way, it is possible to shift the element temperature by computing the necessary element temperature from the fundamental wave input required for obtaining the harmonic wave set in the output setting device 201.

Figure 14:
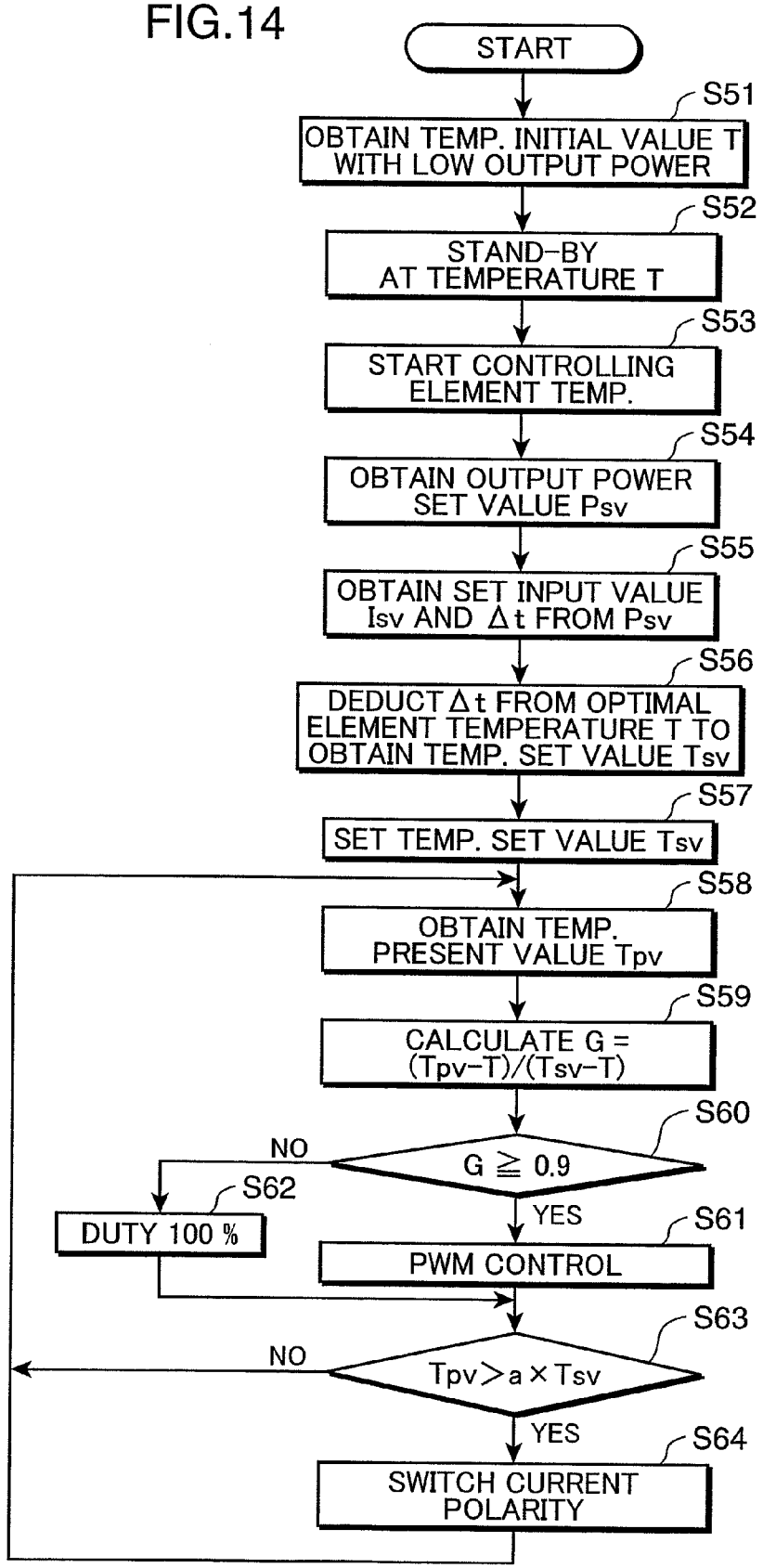
FIG. 14 is a flowchart showing processes of controlling a wavelength conversion element by a temperature controller in accordance with still another embodiment of the present invention in normal state.
Figure 15:
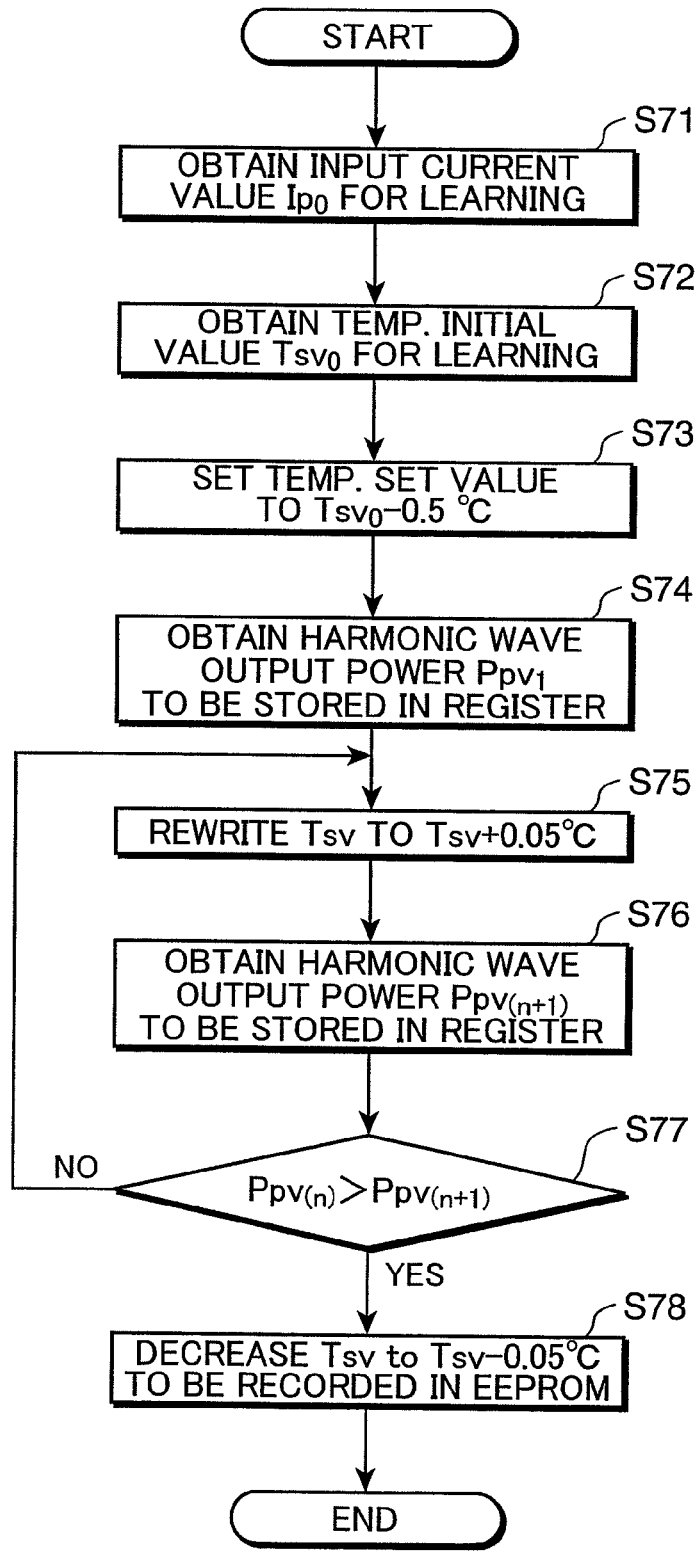
FIG. 15 is a flowchart showing processes of controlling a wavelength conversion element by a temperature controller when executing the element temperature learning processes in accordance with still another embodiment of the present invention.

FIG. 14 is a flowchart showing processes of controlling a wavelength conversion element by a temperature controller in accordance with the present invention in normal state. FIG. 15 is a flowchart showing processes of controlling a wavelength conversion element by a temperature controller when executing the element temperature learning processes in accordance with the present embodiment.

In the present embodiment, as a preparation state for controlling the element temperature in accordance with the present embodiment, an optimal element temperature T is obtained when outputting lower power harmonic wave from the EEPROM 706 (S51). Then, the temperature of the harmonic wave conversion element 209 is adjusted to the element temperature T, and the device is set in a standby state (S52).

Upon starting the processes of controlling the element temperature (S53), the output set value Psv is obtained from the EEPROM 706 (S54). Next, based on the output set value Psv thus obtained, the input set value Isv and the ΔT required for the target output level are obtained from the EEPROM 706 (S55).

Next, ΔT thus obtained in S55 is subtracted from the optimal element temperature T for low power output (S56), and the resulting temperature is set (S57). The temperature learning processes of the present embodiment differ in that only ΔT is used for the information indicative of target temperature of the wavelength conversion element from other embodiments which use information indicative of temperatures corresponding to the output power levels of the harmonic wave.

Next, the temperature present value Tpv of the wavelength conversion element 209 is obtained from the thermistor 703 (S58). Then, the processes for controlling current to be applied to the temperature holder 216 are started with regard to the waveform and the polarity (in the case of adopting Peltier device as the temperature holder 216) of the current to be applied to the temperature holder 216 in the same manner as the first embodiment explained with reference to the flowchart of FIG. 8.

A coefficient G for use in controlling the current waveform is computed from the following formula (6) based on the temperature initial value T, the set temperature value Tsv, and the temperature present value Tpv (S59).

$$G=(Tpv-T)/(Tsv-T) \qquad (6).$$

In the present embodiment, the current waveform is controlled by switching a duty ratio, based on the coefficient G computed in S58.

When the condition of G≧0.9 is satisfied (YES in S60), the PWM control is performed (S61). On the other hand, when the condition of G≧0.9 is not satisfied (NO in S60), the duty ratio is set to 100%, and the PWM control is not performed (S62).

In replace of the foregoing structure of switching the duty ratio based on the coefficient G, it may be arranged so as to directly use the computed value from the equation of the current duty ratio for controlling temperature=b*(1−G)/(b+G) using the coefficient G and the coefficient b (0<b≦1).

Next, it is determined if a change in current polarity is required by the following inequality (7) using Tpv, Tsv and a coefficient a (S63).

$$Tpv>a \times Tsv \qquad (7).$$

When the above inequality (7) holds (YES in S63), the polarity of current is changed (S64). On the other hand, when the inequality (7) does not hold (NO in S63), it is determined if the above inequality holds in S63 without performing the PWM control in S61.

The coefficient a in the inequality (7) is adopted for preventing the polarity of current to be switched to the normal state frequently. It is preferable that the coefficient a falls in a range of from 1.1 to 1.2.

As in the case of the first embodiment, when Tpv is in a range of 1.1 Tsv to 1.2 Tsv, the current may be cut to reduce the temperature of the wavelength conversion element 209 by natural cooling.

After the polarity of current changes in S64, the sequence goes back to S58 where the current temperature value of the wavelength conversion element 209 is obtained. By repeating the foregoing processes, a green light can be outputted under stable conditions.

Then, the temperature present value Tpv is obtained, and the processes for controlling current to be applied to the temperature holder 216 are started with regard to waveform and polarity (in the case of adopting Peltier device as the temperature holder 216) based on the temperature initial value T, the temperature set value Tsv, and the temperature present value Tpv.

Here, the temperature set value is not changed unless the output power set value changes via the control unit 225 from the output setting device 201. Namely, when the auto power control is performed, it is known the fundamental wave input level is subjected to fluctuations. In the present embodiment, the temperature of the wavelength conversion temperature is not adjusted for such fluctuations.

Next, the processes for learning temperature of the wavelength conversion element 209 will be explained with reference to FIG. 15.

Upon starting the element temperature learning processes, first, the output set value Psv for learning is obtained from the EEPROM 706. Here, the output set value Psv for learning is set to be low. Specifically, the output level of the harmonic wave outputted from the wavelength conversion element 209 is set in a range of from 100 mW to 200 mW. By setting the amount of the laser beam generated while the temperature learning processes are being carried out to be such a low level, it is possible to prevent the light beam from being leaked out of the device main body through a shutter, for example. In the present embodiment, the temperature set value Tsv is determined based on the output set value Psv for learning.

Upon starting the element temperature learning processes, first, the input current $I_{p0}$ for learning is obtained from the EEPROM 706 (S71). In the meantime, the initial temperature ($Tsv_0$) for learning is obtained from the EEPROM 706 (S72).

For the element temperature learning processes of the wavelength conversion element 209, a phase matching temperature of the wavelength conversion element 209 is searched based on peak hold by scanning temperatures. Therefore, the temperature set value is set to 0.5 (° C.) below Tsv (S73).

Then, the harmonic wave with an output level of $Ppv_1$ is actually generated, to be stored in the register 705 (S74). The temperature set value Tsv is then increased by 0.05 (° C.) to be replaced with the currently set temperature (S75).

Next, the harmonic wave with an output level of $Ppv_{(n+1)}$ of the nth loop is obtained to be temporarily stored in the register 705 (S76). The harmonic wave with an output level of $Ppv_{(n+1)}$ is then compared with the harmonic wave with an output level of $Ppv_n$ (S77).

$$Ppv_n > Ppv_{(n+1)} \quad (8).$$

When the above inequality (8) does not hold (NO in S77), the temperature set value Tsv is increased again by 0.05 (° C.) to be replaced with the currently set temperature repetitively. On the other hand, if the above inequality (8) holds (YES in S77), the sequence goes out of the loop and, the temperature set value Tsv is then reduced by 0.05 (° C.) to be stored in the EEPROM 706 as an optimal temperature value (S78), thereby terminating the foregoing element temperature learning processes.

In the foregoing element temperature leaning processes, the initial temperature set value is set to 0.5 (° C.) below Tsv. However, how many degrees to be decreased from the Tsv is to be determined based on the tolerance range for temperatures (temperature range at which the output level is ½) of the wavelength conversion element 209, i.e., half width at half maximum, HWHM from the peak to the ½ of the output level.

Here, in order to prevent the misreading of the sub-peak in the temperature tuning curve of the harmonic wave output as the peak, it is desirable that a drop in temperature be set to 0.5 to 1 times of the tolerance range for the temperature Δt of the wavelength conversion element 209.

As described, the foregoing present embodiment performs the same operation as those of the first and second embodiments except for that the input level for fundamental wave for learning is set for a small output level for the harmonic wave as compared to those in the first and second embodiments.

Fourth Embodiment

The following descriptions will explain still another embodiment of the present invention with reference to figures.

In the present embodiment, the method of determining a re-setting timing for the holding temperature and the method of making fine adjustments on the temperature of the wavelength conversion element 209 will be explained in consideration of changes in desirable holding temperature of the wavelength conversion element 209 as time passes.

As to the method of determining the timing for executing the element temperature learning processes mentioned in the first embodiment, the present embodiment adopts the following method. That is, the timing for executing the element temperature learning processes is determined based on how closer to the upper limit current value for the pump LD 232, is the current value required to be applied to the pump LD 232 in order to obtain the harmonic wave of an output level as set in the output setting device 201.

Firstly, the ratio of the current value $I_{pv}$ in the pump LD 232 to the current limit current value $I_{lim}$ to the pump LD 232 is monitored, to determine the re-setting timing for the temperature of the wavelength conversion element 209 as explained below.

In this method, in the control loop for carrying out the auto power control of the harmonic wave output, the process of computing the $I_{pv}/I_{lim}$ is incorporated, so that the ratio of the current value Ipv that flows in the pump LD 232 to the upper limit current value for the pump LD 232 can be monitored through out the element learning processes.

In the present embodiment, the ratio of the current value $I_{pv}$ to the current limit value $I_{lim}$ of the pump LD 232 satisfies the following inequality (9), it is determined that the ratio falls in a normal range to perform the normal state operation.

$$0 < I_{pv}/I_{lim} < 0.8 \quad (9).$$

On the other hand, the ratio of the current value $I_{pv}$ to the current limit value $I_{lim}$ of the pump LD 232 satisfies the following inequality (10), it is determined that the ratio falls in an abnormal range, and therefore determined that the element temperature learning processes are to be executed.

$$0.8 \leq I_{pv}/I_{lim} \quad (10).$$

Here, an auto power control method may be adopted, wherein the current value required to be applied to the pump LD 232 to obtain the harmonic wave of the output level as set in the output setting device is recorded in the EEPROM 706 before or after driving.

Specifically, it may be arranged so as to execute the element temperature learning processes when the following equation is to be satisfied:

$$I_1 \times (1 + d/100) = I_{lim} \quad (11)$$

wherein $I_1$ indicates a required LD current value for obtaining the output $P_1$, and d (%) indicates a margin required for the limit value $I_{lim}$ of the current to the pump LD 232 and the auto power control.

Here, a program may be set to instruct a computer to automatically carry out the temperature learning processes when determined based on the equation (11) that it is desirable to execute the element temperature learning processes while informing the user of that the device is being in the element temperature learning processes. Alternatively, it may be arranged such that the user operates the device to execute the temperature learning processes in response to a caution to do so.

In addition to the method of determining the timing for executing the element temperature learning processes based on how closer to the upper limit current value of the current to be applied to the pump LD 232, is the current value required for the pump LD 232 to obtain the harmonic wave of an output level as set in the output setting device 201, the following method will be explained.

That is, a harmonic wave output is generated using a rectangular modulation, and the modulation waveform of the driving current is compared with the waveform of the harmonic wave output, and the present temperature of the wavelength conversion element 209 is determined and is adjusted (fine adjustment) based on which part of the output waveform is lacked.

As another method of determining the timing for executing the element temperature learning processes, a method of making fine adjustments on the temperature of the wavelength conversion element will be explained, wherein a harmonic wave output is generated using a rectangular modulation, and the waveform of the current to be inputted to the fundamental wave light source 231 is compared with the waveform of the harmonic wave output.

Figure 16A:
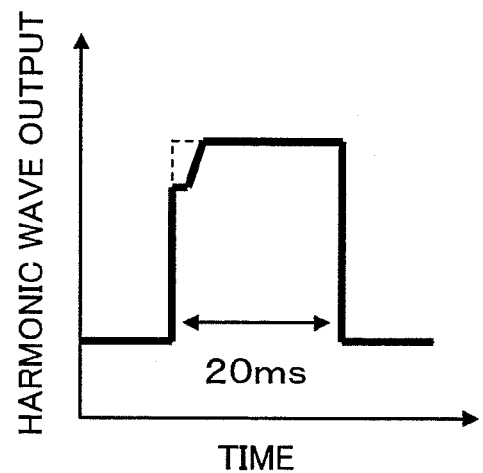
FIGS. 16A to 16C are explanatory views which depict harmonic wave output pulse waveform based on which fine adjustments in temperatures of a wavelength conversion element are to be made in accordance with still another embodiment of the present invention.
Figure 16B:
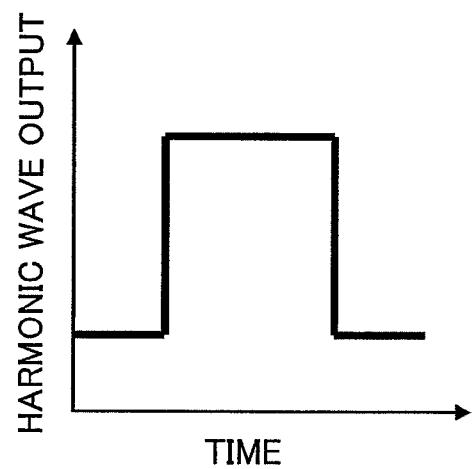
Figure 16C:
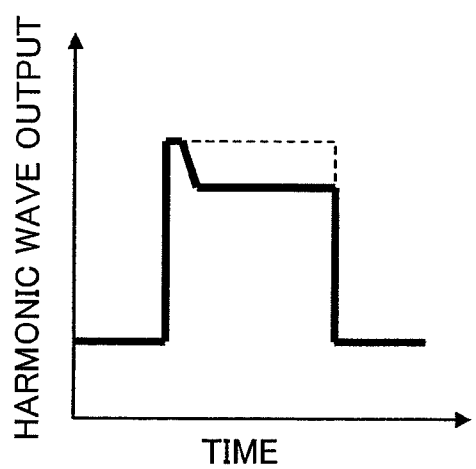

FIGS. 16A to 16C show the relationship between the temperature of the wavelength conversion element 209 and the harmonic wave output pulse waveform. FIGS. 16A to 16C show the harmonic wave output waveform when applying the current pulse waveform with the pulse width of 20 msec and the duty of 33% as a modulation signal to the light source in the case of obtaining the harmonic wave of the output level of 2.2 W in response to the fundamental wave input of 6.5 W at a wave height value. FIG. 16A shows the case where the temperature of the wavelength conversion element 209 is 0.3 (° C.) below the phase matching temperature; FIG. 16B shows the case where the temperature of the wavelength conversion element 209 is at the phase matching temperature; and FIG. 16C shows the where the temperature of the wavelength conversion element 209 is 0.3 (° C.) above the phase matching temperature. Incidentally, the dotted line shown in FIG. 16A and FIG. 16C show the shape of the current signal waveform to be inputted to the fundamental wave light source.

As shown in FIG. 16A, when the temperature of the wavelength conversion element 209 is 0.3 (° C.) below the phase matching temperature, the element temperature is low, and the harmonic wave is at the low level at the moment the current pulse is inputted. However, the temperature of the wavelength conversion element 209 is raised by the harmonic wave as generated, and the wavelength conversion element 209 becomes in the phase matching state. Therefore, in the case of FIG. 16A, the wave height value as set can be obtained for the latter half of the output waveform as modulated, and the output waveform is lacked in a range of 20% to 50% at the beginning (at a rise) of the output waveform.

On the other hand, as shown in FIG. 16C, when the temperature of the wavelength conversion element 209 is 0.3 (° C.) above the phase matching temperature, the temperature of the wavelength conversion element 209 is at around the phase matching temperature and the harmonic wave of the wave height value as set can be obtained at the moment the current pulse is inputted. However, as the temperature of the wavelength conversion element 209 is further raised by the harmonic wave as generated, the wavelength conversion element 209 becomes out of the phase matching state. Therefore, in the case of FIG. 16A, in the latter half of the output waveform as modulated, the wave height value as set cannot be obtained, and the output waveform is lacked in a range of 20% to 50% at the end (at a fall) of the output waveform.

As shown in FIG. 16B, in the phase matching state, the current pulse waveform is matched with the waveform of the harmonic wave actually outputted. As described, by comparing the current pulse waveform with the waveform of the harmonic wave output, it can be observed to which direction (lower temperature side or higher temperature side), the temperature of the wavelength conversion element 209 is shifted from the phase matching temperature.

Figure 17:
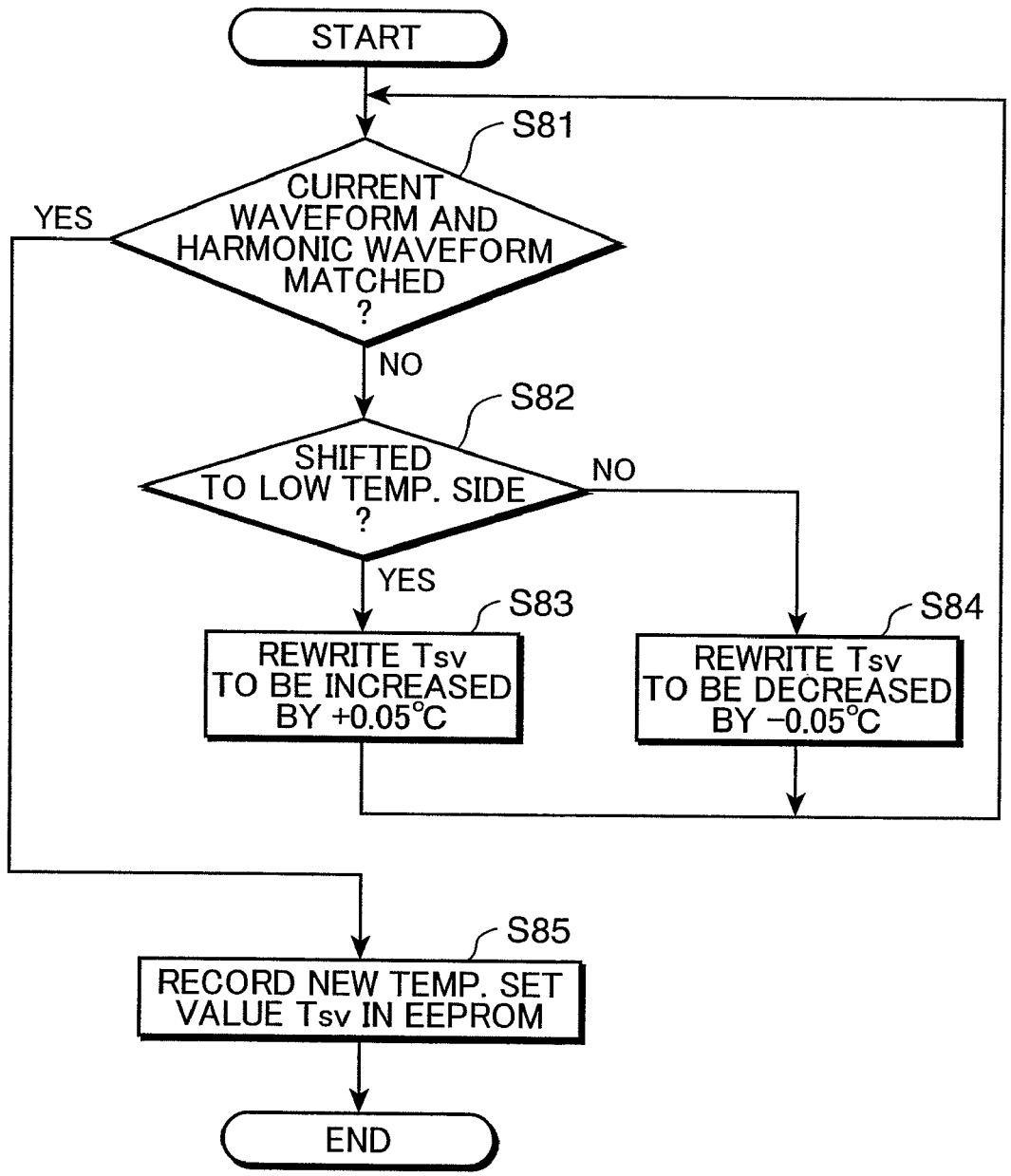
FIG. 17 is a flowchart showing processes of making fine adjustment in temperatures of a wavelength conversion element based on pulse waveform in accordance with still another embodiment of the present invention.

FIG. 17 is a flowchart showing processes of making fine adjustment in temperatures of the wavelength conversion element 209 based on pulse waveform in accordance with the present embodiment adopting the foregoing method.

Firstly, processes in the fine adjustment modes are executed in the state where the harmonic wave output is in the rectangular modulation. Here, it may be arranged so as to set the light emission mode to the output modulation (rectangular modulation) when activating the fine adjustment mode.

As shown in the flowchart of FIG. 17, first, the waveform of the current to be inputted to the fundamental wave light source 231 is compared with the waveform of the harmonic wave (S81). As a result of comparison in S81, if the current waveform does not match the harmonic wave waveform (NO in S81), it is judged if the temperature of the wavelength conversion element 209 is shifted to the lower temperature side from the phase matching state (S82), i.e., if the harmonic wave waveform is lacked at the beginning (at a rise) as shown in FIG. 16A.

If it is judged that the temperature of the wavelength conversion element 209 is shifted to the lower temperature side from the phase matching state (YES in S82), the temperature of the wavelength conversion element 209 is increased until the current waveform is matched with the harmonic wave waveform (YES in S82) by 0.05 (° C.) each time (S83).

On the other hand, if it is judged that the temperature of the wavelength conversion element 209 is shifted to the higher temperature side from the phase matching state (NO in S82), the temperature of the wavelength conversion element 209 is decreased until the current waveform is matched with the harmonic wave waveform (YES in S82) by 0.05 (° C.) each time (S84).

With the foregoing processes, when the current waveform is matched with the waveform of the harmonic wave output, fine adjustment processes are terminated (YES in S82). Then, the new element temperature set value is recorded in the EEPROM 706 (S85).

Here, it is desirable that the temperature of the wavelength conversion element 209 is increased in a range of 0.05 (° C.) to 0.1 (° C.) each time. The lower limit of 0.05 (° C.) is set in consideration of the temperature detection precision, and the upper limit of 0.1 (° C.) is set in consideration of suppressing fluctuations in output level. The temperature of the wavelength conversion element 209 can be maintained in an appropriate temperature range by the foregoing processes, and the processes of making fine adjustments are terminated when the waveform of the current pulse is matched with the waveform of the harmonic wave.

For example, when warming up after turning ON the power supply, the current pulse waveform with the pulse width of 20 msec and the duty of 33% is inputted as a modulation signal to the fundamental wave light source 231, and temperature of the wavelength conversion element 209 is adjusted to a phase matching temperature, based on the waveform of the harmonic wave as observed. Alternatively, the temperature of the wavelength conversion element 209 may be adjusted to the phase matching state based on the waveform of the harmonic wave output as observed when actually using in the output modulation state. This method is advantageous in that the temperature of the wavelength conversion element 209 can be adjusted while the device is being used.

Incidentally, in consideration of the feedback to the element temperature based on the waveform shape of the modulated harmonic wave, it is desirable that the modulation signal has a pulse width of not less than 100 μsec.

Alternatively, for example, a Q switch may be used for the fundamental wave light source 231 to oscillate a high peak pulse. In this case, the temperature of the wavelength conversion element 209 can be set by obtaining the pulse string of the harmonic wave output of not less than 100 μsec, and comparing the envelope with the current signal waveform.

Fifth Embodiment

The following descriptions will explain still another embodiment of the present invention with reference to figures.

A wavelength conversion laser light source 200 in accordance with the present embodiment is arranged so as to change a beam diameter of the second harmonic wave itself according to the intensity of the second harmonic wave 220 by the wavelength conversion element (nonlinear optical crystals) 209 according to the intensity of the second harmonic wave 220.

To realize the foregoing structure, the photoreceptor 212 of the wavelength conversion laser light source 200 restricts a value of the harmonic wave output based on changes in beam diameter.

In the present embodiment, MgO:LiNbO$_3$ crystal element is adopted as the non-linear optical crystals, wherein the periodical polarization inversion structure is formed. By using the periodical polarization inversion structure MgO:LiNbO$_3$ crystal element, the conversion efficiency from the fundamental wave to a green light (the second harmonic wave) can be improved significantly. Furthermore, when adopting the crystal element in the wavelength conversion optical system which satisfies the confocal condition, it is possible to realize the function of varying the beam diameter according to the intensity of the second harmonic wave output.

When adopting the MgO:LiNbO$_3$ crystal element having the periodically poled structure as non-linear optical crystals as in the present embodiment, it becomes clear that the beam shape changes according to an output level of the second harmonic wave generated by the wavelength conversion.

An example of the optical system, wherein a beam shape varies according to an output level of a second harmonic wave, will be explained through an example shown in FIG. 18A. The graph of FIG. 18A shows the relationship between the second harmonic wave output level (wavelength of 532 nm) with respect to the fundamental wave (wavelength of 1064 nm).

Figure 18A:
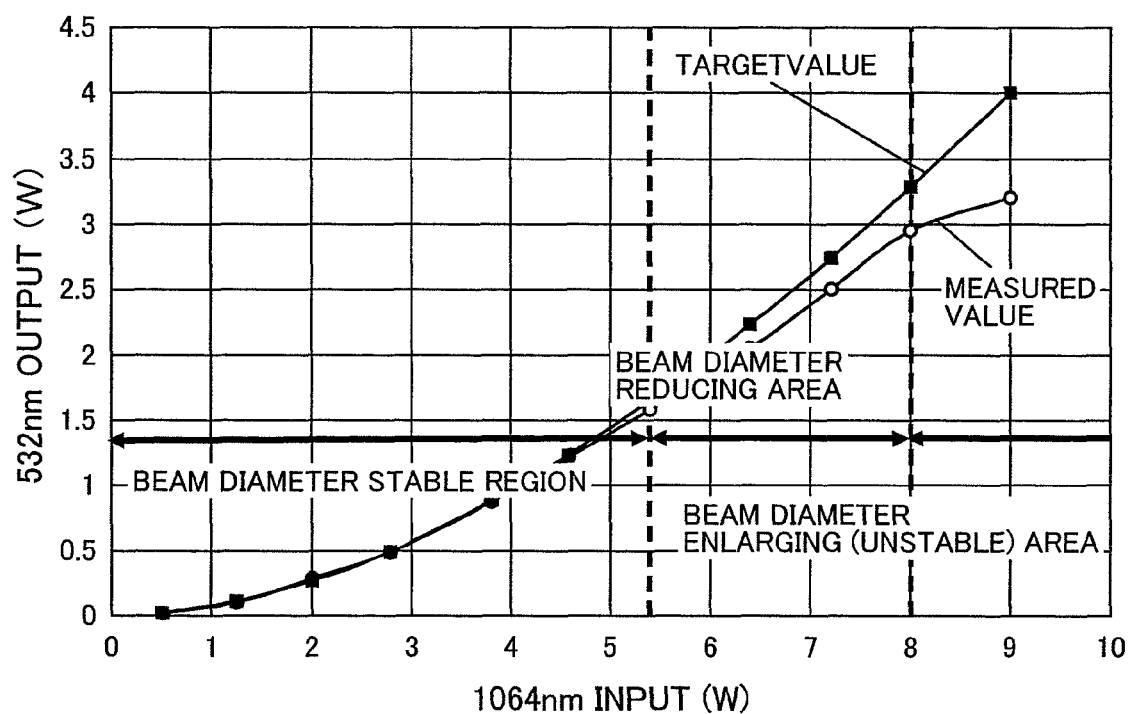
FIG. 18A is a graph showing the relationship between the second harmonic wave output level (wavelength of 532 nm) with respect to the fundamental wave (wavelength of 1064 nm) in accordance with still another embodiment of the present invention.
Figure 18B:
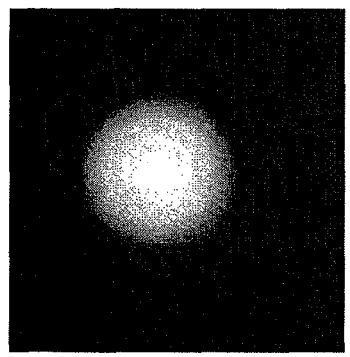
FIGS. 18B and 18C are explanatory views showing the beam shape in accordance with still another embodiment of the present invention.
Figure 18C:
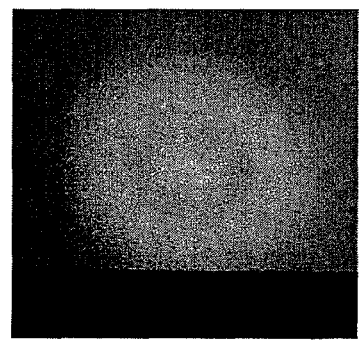

As shown in the graph of FIG. 18A, it is observed that the beam diameter is stabilized in a range of the output of the second harmonic wave from 0 W to 1.6 W, and hardly varies (FIG. 18B). On the other hand, from the point where the output of the second harmonic wave becomes larger than 1.6 W, it is observed that the beam diameter gradually becomes smaller, and at a point the output of the second harmonic wave exceeds 3 W, the beam becomes in a doughnut shape, and the harmonic wave output becomes unstable (FIG. 18C).

When adopting the MgO:LiNbO$_3$ crystal element (MgLNO$_3$ element), it is confirmed that for the second harmonic wave output range (530 nm) in a range of from 2.3 W to 3.0 W, the fundamental wave input is not larger than 6.5 w, and an abnormality in beam shape is not observed. In the case of adopting LiTaO$_3$ of stoichiometry having added thereto MgO, even for the output of the second harmonic wave of up to 9 W, the beam does not become in a doughnut shape. In view of the foregoing, it is confirmed that the output of the second harmonic wave, with which an abnormality in beam shape is observed, changes according to the wavelength. Specifically, it is confirmed that the longer is the wavelength, the larger is the output level.

The second harmonic wave 220 having wavelength converted by the wavelength conversion element (non-linear optical crystal) 209 is formed into a parallel beam by the re-collimating lens 211. After having formed into the parallel beam, the second harmonic wave 220 is separated by the beamsplitter 213, and is partially received by the photoreceptor (photodiode) 212. On the other hand, a main beam of the second harmonic wave 220 passes through the beamsplitter 213, and is optically connected to a delivery optical fiber 206 from the optical fiber incident surface 206a by the coupled lens 214. Here, the beam diameter of the second harmonic wave 220 changes, which in turn changes the NA at the focal position 701 of the beam as converged by the coupled lens 214.

For the detection of an abnormality in beam diameter, the photoreceptor 212 is divided into the first region 1901 and the second region 1902. In the present embodiment, it is arranged such that a normal beam 1903 is incident in the first region 1901.

According to the foregoing structure, when the output power becomes too large, and the output is formed in a doughnut beam 1904, the light beam is incident in the second region 1902 of the photoreceptor 212.

Figure 20A:
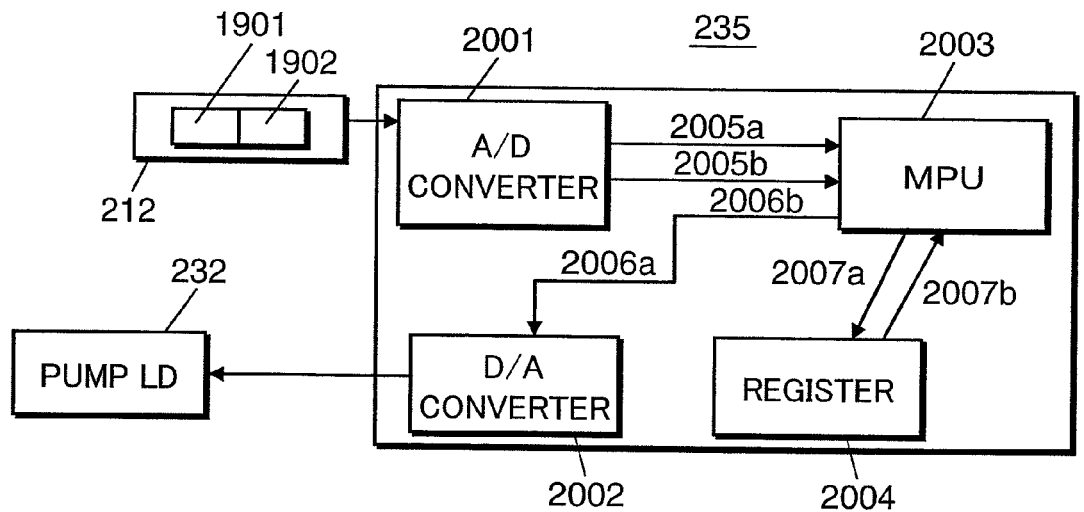
FIG. 20A is a block diagram schematically showing a structure of a control unit of a mechanism of detecting an abnormality in beam diameter in accordance with still another embodiment of the present invention.
Figure 20B:
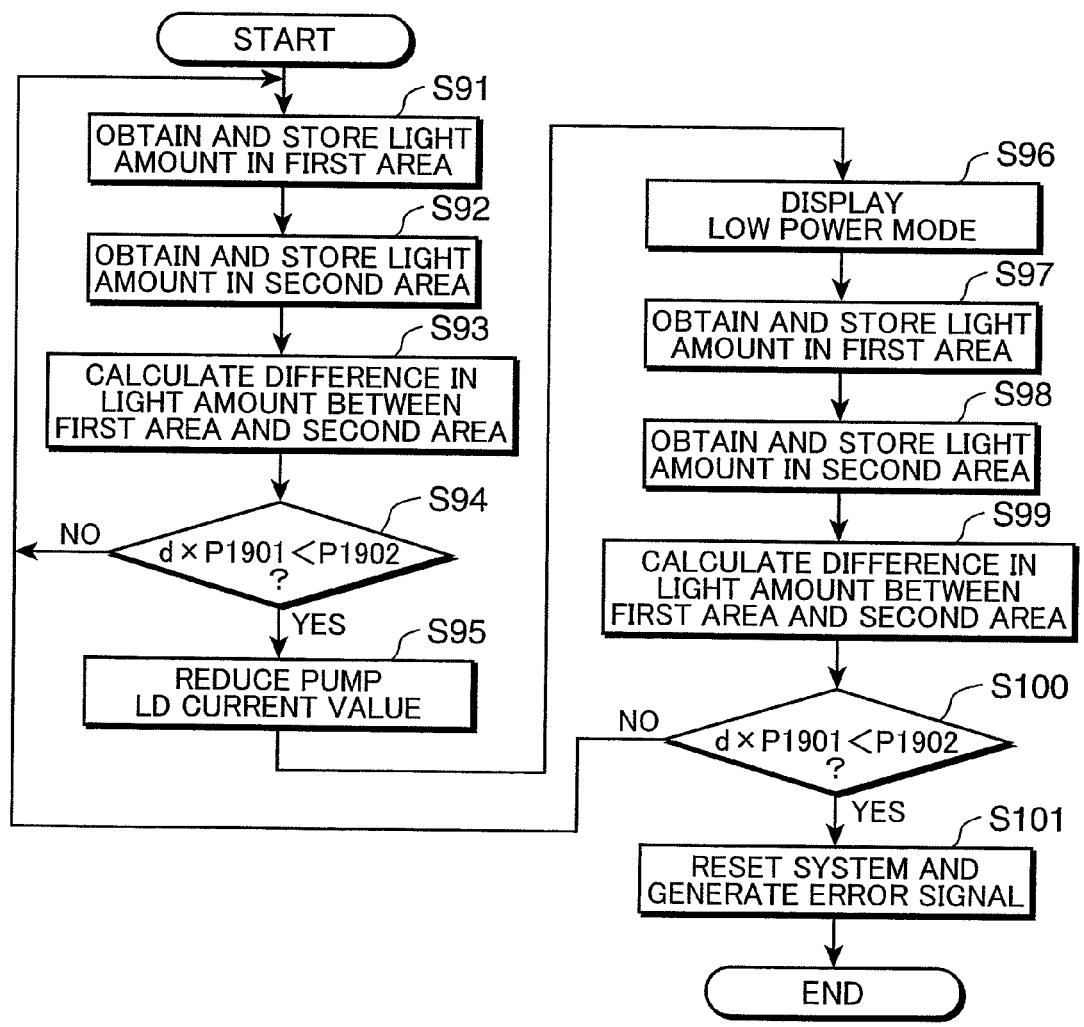
FIG. 20B is a flowchart showing control processes by a control unit of a mechanism of detecting an abnormality in beam diameter in accordance with still another embodiment of the present invention.

FIG. 20A is a block diagram schematically showing a structure of a control unit of a mechanism of detecting an abnormality in beam diameter in accordance with the present embodiment. FIG. 20B is a flowchart showing control processes by the control unit 225 for detecting an abnormality in beam diameter in accordance with the present embodiment.

As shown in FIG. 20A, the control unit 225 includes, an A/D converter 2001, a D/A converter 2002, an MPU 2003, and a register 2004.

Next, the control processes for detecting an abnormality in beam diameter will be explained in reference to the flowchart of FIG. 20B. An amount of light received is obtained in the first region 1901 of the photoreceptor 212, and is stored (S91). An amount of light received is obtained also in the second region 1902 of the photoreceptor 212, and is stored (S92). These amounts of light received are converted into digital signals by the A/D converter 2001, and are then stored in the register 2004 shown in FIG. 20A. The MPU 2003 computes a difference using respective amounts of light as stored (S93).

Here, the current to be applied to the pump LD 232 is reduced (S95) when the following inequality is satisfied (YES in S94) to avoid an abnormality in beam shape.

$$d \times P1901 < P1902 \tag{12}$$

wherein P1901 indicates an amount of light received in the first region P1901, and the second region P1902 indicates an amount of light received in the second region 1902. In this state, the information indicative of a low power mode is displayed in, for example, a consol of the device (S96). In the present embodiment, the coefficient d adopted in the difference computation may be set to 0.5, for example.

Then, amounts of light as received respectively in the first region 1901 and the second region 1902 are obtained again (S97 and S98), and a difference computation is performed (S99). As a result, if the beam in a doughnut shape is not observed (NO in S100), the driving is continued in low power mode. On the other hand, if the beam in a doughnut shape is still observed (YES in S100) for the second time difference computation, the system is reset, and an error signal is generated (S101). Here, the steps of resetting the system and generating an error signal are performed based on the second time difference computation. However, the present embodiment is not intended to be limited to the foregoing method, and, for example, the steps of resetting the system and generating an error signal may be performed based on the third time difference computation.

Figure 21A:
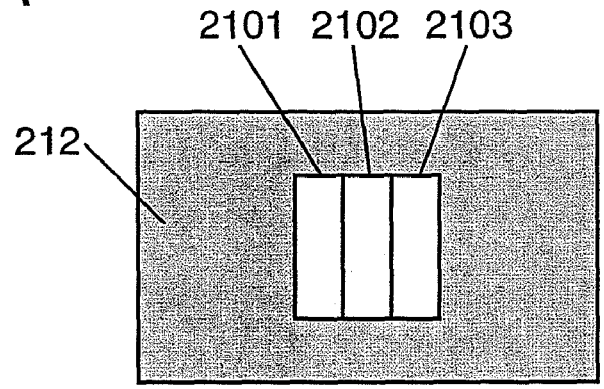
FIG. 21A is an explanatory view, which depicts one example of a photoreceptor of a mechanism of detecting an abnormality in beam diameter in accordance with still another embodiment of the present invention.
Figure 21B:
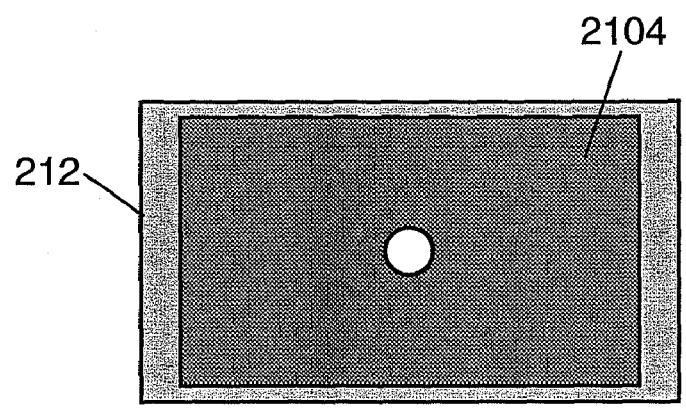
FIG. 21B is an explanatory view, which depicts another example of a photoreceptor of a mechanism of detecting an abnormality in beam diameter in accordance with still another embodiment of the present invention.
Figure 21C:
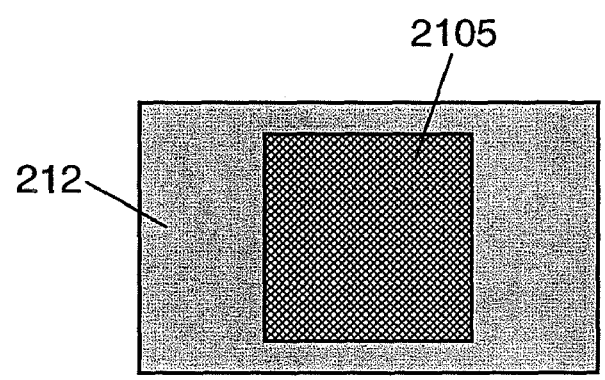
FIG. 21C is an explanatory view, which depicts still another example of a photoreceptor of a mechanism of detecting an abnormality in beam diameter in accordance with still another embodiment of the present invention.

FIG. 21A through FIG. 21C are explanatory views, which depict examples of a photoreceptor of a mechanism of detecting an abnormality in beam diameter in accordance with the present embodiment.

The difference computation is performed with a coefficient d of 0.5 in the present embodiment; however, the coefficient d can be set in a range of from 0 to 0.5 in consideration of a stray light generated in the optical arrangement, or the like.

For the photoreceptor 212 (photodiode, etc.), the present embodiment is not intended to be limited to those divided into two regions, and, for example, those divided into three regions (regions 2101, 2102 and 2103) as shown in FIG. 21A, and those divided into four regions may be adopted. As shown in FIG. 21B, other than above examples, a photoreceptor 212 masked with a pinhole 2104 as shown in FIG. 21B, or the CCD (Charge Coupled Device) element 2105 may be used as shown in FIG. 21C.

Figure 19A:
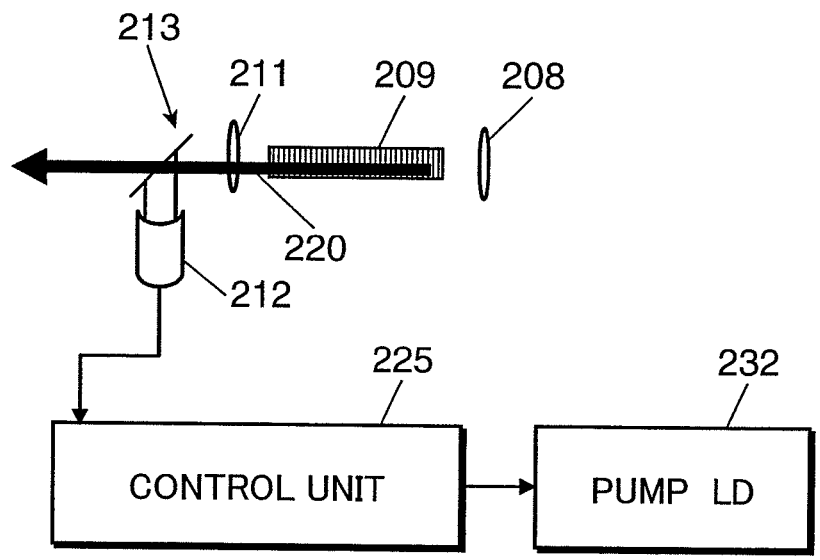
FIG. 19A is an enlarged view schematically showing an abnormality in beam diameter determining mechanism in accordance with still another embodiment of the present invention.
Figure 19B:
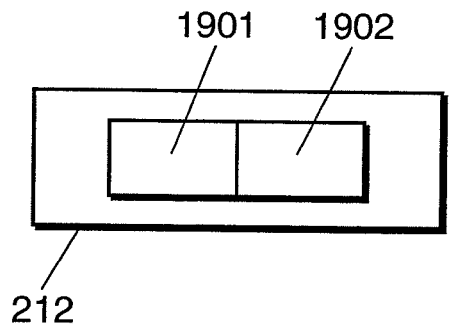
FIG. 19B is an explanatory view, which depicts a schematic structure of a photoreceptor in accordance with a still another embodiment of the present invention.
Figure 19C:
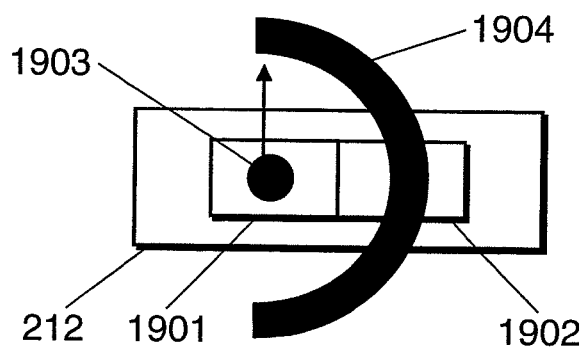
FIG. 19C is an explanatory view, which explains a mechanism of detecting an abnormality in beam diameter when adopting a photoreceptor in accordance with still another embodiment of the present invention.

The photoreceptor 212 masked with the pinhole 2104 shown in FIG. 21B is most suited in terms of manufacturing costs; however, when adopting this photoreceptor 212, it is required to determine if an abnormality in beam shape occurs by collating with the input value of the current applied to the pump LD 232. In the case of adopting the CCD element 2105 shown in FIG. 21C, it is required to perform the image processing, the image processing, or the image process when overflowing charges are required. The divided photodiode shown in FIG. 19B or FIG. 21A is the most desirable for convenience in use.

As the method of preventing an abnormality in beam diameter, the method of shifting the focal position of the fundamental wave may be adopted, which offers the same effect.

Figure 22A:
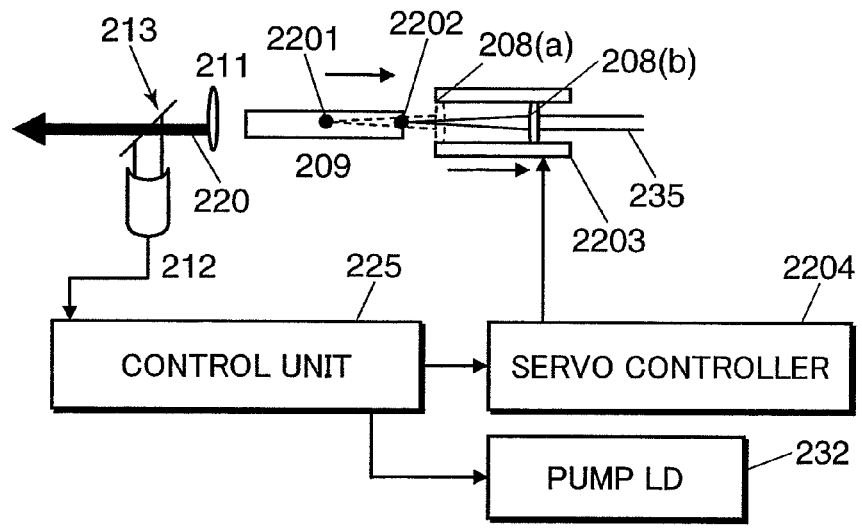
FIG. 22A is an explanatory view schematically showing a structure of a control unit of a mechanism of detecting an abnormality in beam diameter in accordance with still another embodiment of the present invention.
Figure 22B:
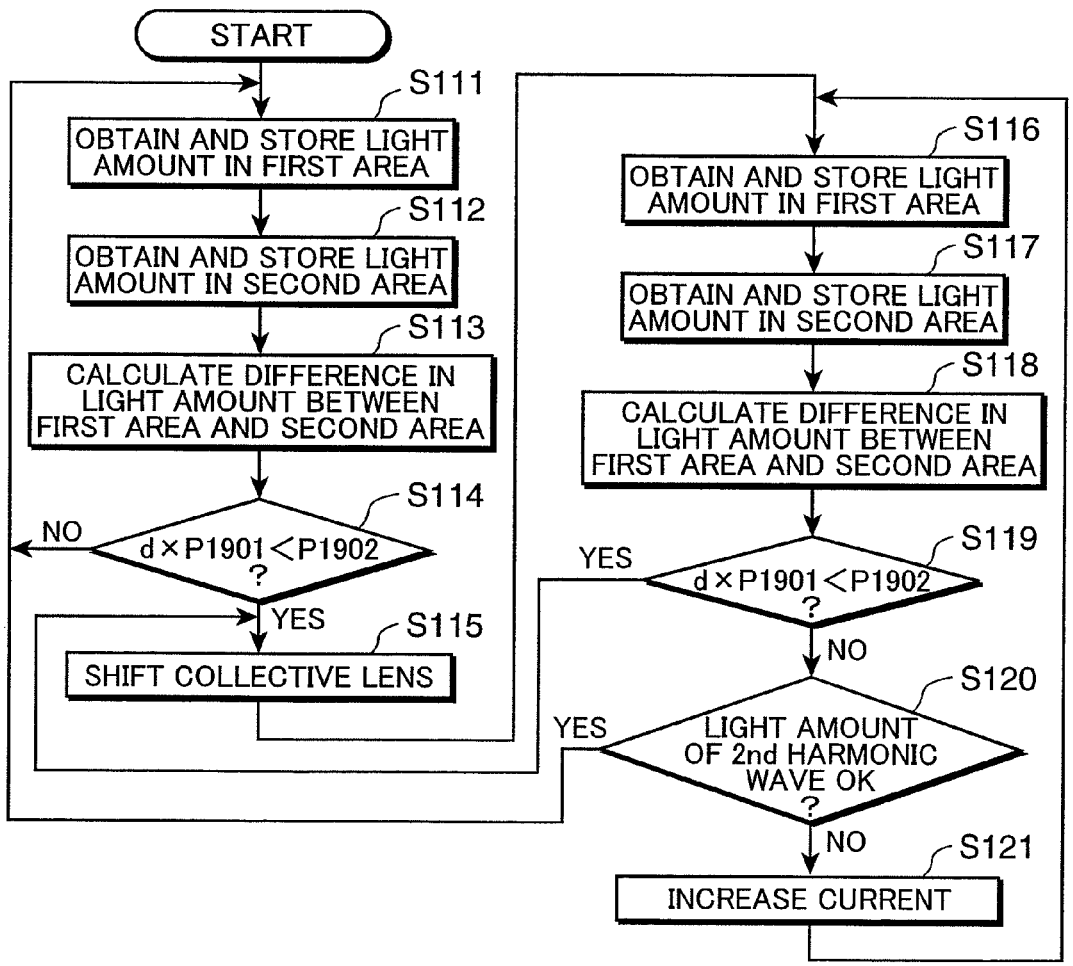
FIG. 22B is a flowchart showing control processes by a control unit of a mechanism of detecting an abnormality in beam diameter in accordance with still another embodiment of the present invention.

FIG. 22A is an explanatory view schematically showing the structure of the control unit 225 for detecting the abnormality in beam diameter in accordance with the present embodiment. FIG. 22B is a flowchart showing control processes by the control unit 225 for detecting an abnormality in beam diameter in accordance with the present embodiment.

The second harmonic wave 220 having wavelength converted by the wavelength conversion element (non-linear optical crystal) 209 is formed into a parallel beam by the re-collimating lens 211. After having formed into the parallel beam, the beam is separated by the beamsplitter 213 into the harmonic wave by the photoreceptor (photodiode) 212 and the other beam. On the other hand, a main beam of the second harmonic wave 220 passes through the beamsplitter 213, and is outputted to the outside.

For the detection of an abnormality in beam diameter of the second harmonic wave 220, adopted is the photoreceptor 212 divided into the first region 1901 and the second region 1902, to obtain respective light amounts received in the first region 1901 and the second region 1902, and a difference computation of light amounts respectively received in these regions is performed. As a result of difference computation, if it is judged that the beam is in a doughnut shape, the collective lens 208 is shifted from the position indicated by 208(a) to the position indicated by 208(b) so as to shift the focal position 2201 of the fundamental wave 235 to the light incident side (to the side of the focal position 2202). In this way, the beam in a doughnut shape becomes no longer observed; however, the amount of the second harmonic wave 220 generated would be reduced. In response, the current applied to the pump LD 232 is increased, to maintain the light amount so that the output level of the second harmonic wave can be maintained while eliminating the beam in doughnut shape.

Next, the control processes for detecting an abnormality in beam diameter will be explained in reference to the flowchart of FIG. 22B. The respective amounts of light received in the first region 1901 and the second region 1902 of the photoreceptor 212 are converted into digital signals by the A/D converter 2001, and are then stored in the register 2004 (S111 and S112). The MPU 2003 computes a difference using respective amounts of light as stored (S113).

Here, the collective lens 208 is shifted by a predetermined distance (S115) to shift the focal position of the fundamental wave 235 to the light incident side when the inequality (13) is satisfied (YES in S114) to avoid an abnormality in beam shape.

$$d \times P1901 < P1902 \qquad (13)$$

wherein P1901 indicates an amount of light received in the first region P1901, and the second region P1902 indicates an amount of light received in the second region 1902.

Then, amounts of light as received respectively in the first region 1901 and the second region 1902 are obtained again (S116 and S117), and a difference computation is performed (S118). As a result, if the beam in a doughnut shape is still observed (YES in S119), the sequence goes to S115 where the collective lens 208 is shifted again by the predetermined distance.

On the other hand, if the doughnut beam is not observed (NO in S119), the amount of light of the second harmonic wave incident in the first region 1901 is checked (S120). If the amount of light of the second harmonic wave is not sufficient (NO in S120), the current applied to the pump LD 232 is increased by a predetermined amount (S121). Then, the driving is continued while repeating the foregoing steps 116 to S121 until the amount of light of the second harmonic wave reaches the set value (YES in S120).

As described, the amount of light of the fundamental wave is increased by increasing the current applied to the pump LD 232, and in the meantime, an amount of the second harmonic wave incident in the first region 1901 is checked. Then, the processes are carried out along the flowchart of FIG. 22B, to maintain the second harmonic wave at the set output level while eliminating the beam in an abnormality shape (doughnut shape).

In the present embodiment, a green laser to be incident into the fiber, with the beam quality ($M^2$ value) of 1.3 is adopted; however, it is confirmed that the sufficient effect as achieved from the present invention can be achieved as long as the green laser with the beam quality ($M^2$ value) of not higher than 2 is adopted.

In the foregoing first through fifth embodiments, for the non-linear optical crystals, crystals which absorb light (two-photon absorption, for example) by a harmonic wave output, i.e., the wavelength of the harmonic wave generated, it is required to be less than 2 times of a wavelength of an absorption edge of nonlinear optical crystals of the wavelength conversion element. Examples of the nonlinear optical crystals of the wavelength conversion element satisfying the above condition includes: lithium niobate (including those having magnesium oxide added), lithium tantalite (including those having magnesium oxide added), $KTiOPO_4$ (KTP:Potassium Titanyl Phosphate), and the wavelength conversion element generates a green light having a wavelength in a range of from 520 nm to 560 nm from Nd:YAG laser or Yb fiber using these crystals.

As can be seen also from the graph of FIG. 3 which shows the relationship between the harmonic wave output and the fundamental wave input, when obtaining the output level of 500 mW using the wavelength conversion element whose light absorption ratio increases in proportion to the second power of the second harmonic wave generated by absorbing the second harmonic wave, two-photon absorption in particular, effects as achieved from the element temperature setting method in accordance with present embodiment can be appreciated.

As described, according to the foregoing method of the present embodiment, the wavelength conversion element having the light absorbing properties induced by the harmonic wave is used, and the temperature of the wavelength conversion element is set to a temperature at which the harmonic wave output level of 120% of that actually used can be obtained. With this method of searching the phase matching temperature, i.e., an optimal temperature at which the wavelength conversion efficiency can be maximized, even if the fundamental wave input level becomes too high, the output of the second harmonic wave would be saturated. It is therefore possible to prevent the wavelength conversion element from being damaged due to an increase in light absorption ratio in proportion to the second power of the second harmonic wave generated by absorbing the second harmonic wave, two-photon absorption in particular as occurred when searching for a phase matching temperature as an optimal temperature at which the highest wavelength conversion efficiency can be ensured.

Figure 23:
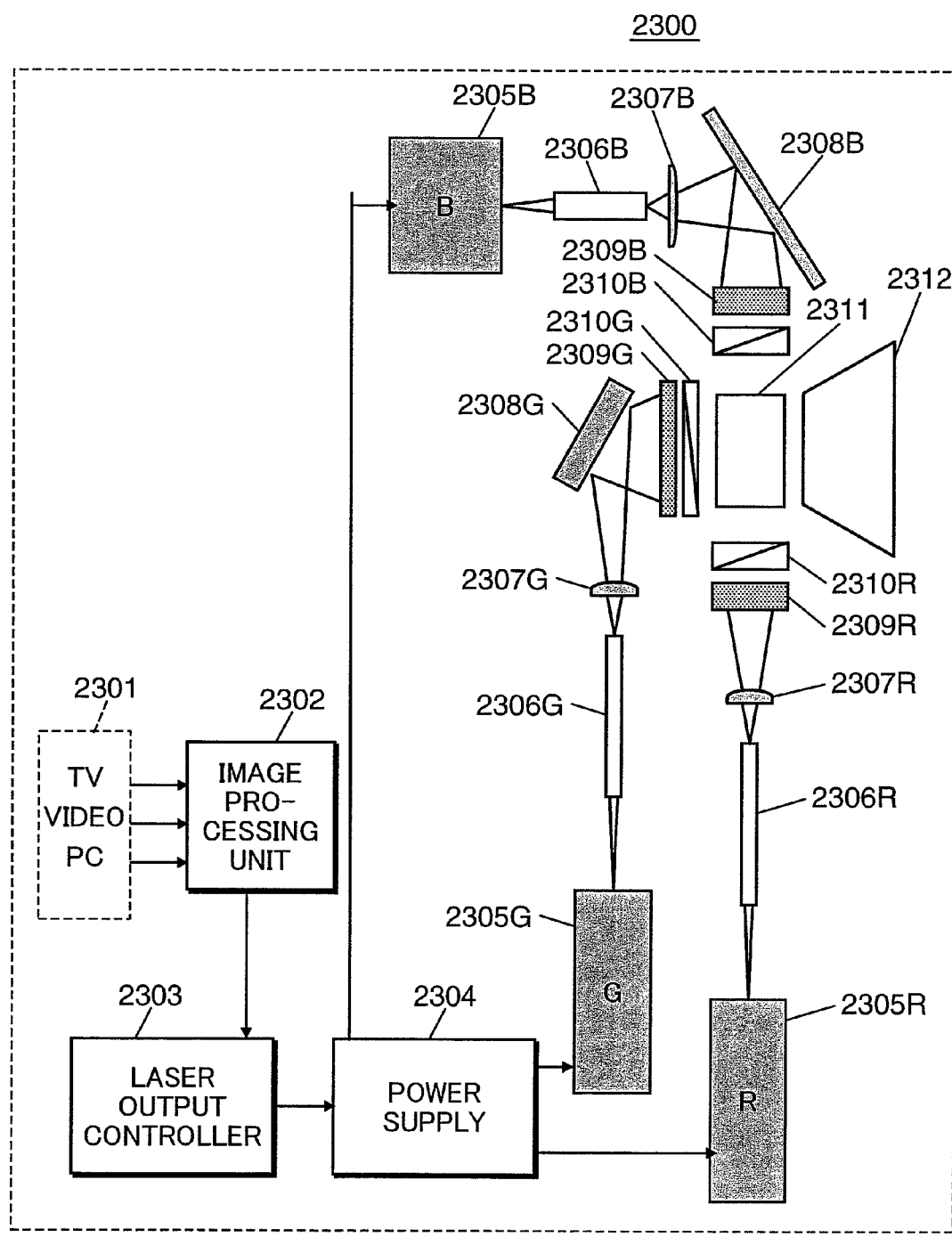
FIG. 23 is an explanatory view schematically showing the structure of a projector (projection display) adopting a laser light source in accordance with still another embodiment of the present invention.

FIG. 23, FIGS. 24A and 24B show an example structure of a two-dimensional image display apparatus adopting the fiber laser light source in accordance with the present embodiment.

One example structure of a laser display (image display apparatus) applied to the wavelength conversion module of the present embodiment will be explained in reference to FIG. 23.

FIG. 23 schematically shows the structure of an optical engine of a projector system adopting a laser light source in accordance with the present embodiment.

The two-dimensional image display device 2300 in accordance with the present embodiment has an optical engine for a projector using 3 LCD panels. The two-dimensional image display device 2300 includes an image processing section 2302, a laser output controller (controller) 2303, an LD power supply 2304, red, green and blue laser light sources 2305R, 2305G, and 2305B, beam shape rod lens 2306R, 2306G, and 2306B, relay lens 2307R, 2307G and 2307B, reflecting mirrors 2308G and 2308B, two-dimensional modulation elements 2309R, 2309G and 2309B for displaying an image; polarizers 2310R, 2310G and 2310B, a combine prism 2311, and a projection lens 2312.

The green laser light source 2305G is controlled by the controller 2303 and the LD power supply 2304 which control an output from the green light source.

A laser beam emitted from each of the red, green and blue laser light sources 2305R, 2305G, and 2305B are formed in a rectangular shape by the beam shape rod lens 2306R, 2306G, and 2306B, and with which, the two-dimensional modulation element in each color is illuminated by the relay lens 2307R, 1307G, and 2307B. Further, two-dimensionally modulated images in respective colors are combined by the combine prism 2311, and the resulting image is projected onto the screen by the projection lens 2312, thereby displaying an image.

The green laser light source 2305G is arranged such that a laser resonator is housed in the fiber. With this structure, it is possible to suppress a reduction in output level and fluctuations in output power as time passes due to an increase in loss in the resonator by dust particles from the outside or a misalignment of the reflective surface.

On the other hand, in the image processing section 2302, a light amount control signal is generated for changing the output level of the laser beam according to the luminance information of the input image signal 2301, and transmits the light amount control signal to the laser output controller 2303. According to the foregoing image processing section 2302, a contrast can be improved by controlling the light amount according to the luminance information.

In this case, the control method (PWM control) may be adopted, wherein an average light amount is changed by pulse driving the laser beam to change the duty ratio (ON time)/(ON time+OFF time) for the ON time of the laser.

The green light source adopted in this projection system may be arranged so as to emit a Green laser beam having a wavelength in a range of from 510 nm to 550 nm. With this structure, it is possible to obtain an output laser beam in Green color of high spectral luminous, thereby realizing a display with a desirable color reproducibility, which can display an image in color close to an original color.

Specifically, the two-dimensional image display device of the present invention includes a screen, a plurality of laser light sources, a scanning section for scanning the laser light sources, wherein the laser light sources include at least laser sources which emit a red color laser beam, a green color laser beam, and a blue color laser beam; and at least the green color light source is provided with the wavelength conversion element having any of the foregoing structures.

With the foregoing structure, an output laser beam in Green color of high spectral luminous can be obtained. It is therefore possible to realize a color still closer to the original color with an application to a display with a desirable color reproducibility.

For the two-dimensional image display device, those of a rear projection display type (FIG. 23), or of a front projection type may be adopted.

For the special modulation element, it is needless to mention that a two-dimensional modulation element of the transmission type liquid crystal or the reflective type liquid crystal, a galvanometer mirror, a DMD or other Micro Electro Mechanical System (MEMS) may be used.

When adopting the light modulation element which is less likely to be affected by polarization components with respect to the light modulation characteristics, such as the reflection-type special modulation element, the MEMS, the galvanometer mirror like the case of the present embodiment, it is not required to adopt a polarization-maintaining optical fiber such as a PANDA (polarization maintaining and absorption reducing) fiber for transmitting the harmonic wave with the optical fiber. On the other hand, when adopting a two-dimensional modulation device using liquid crystals, the modulation property and the polarization property are significantly affected. It is therefore desirable to adopt a polarization-maintaining optical fiber.

FIG. 24 shows one example structure of a display adopting the laser light source. A liquid crystal display 2400 includes, for example, a laser light source 2402, a control unit 2403, a light guide member 2404 for converting the laser light source from a point light source to a linear light source, a light guide plate 2408 for converting the linear light source into a planar light source to be projected onto the entire liquid crystal panel, a polarization plate/diffusion member 2409 for aligning the polarization direction or removing the non-uniform illumination, and a liquid crystal panel 2410, etc. Namely, the light source of the present invention may be used as a backlight source for the liquid crystal display.

Figure 25:
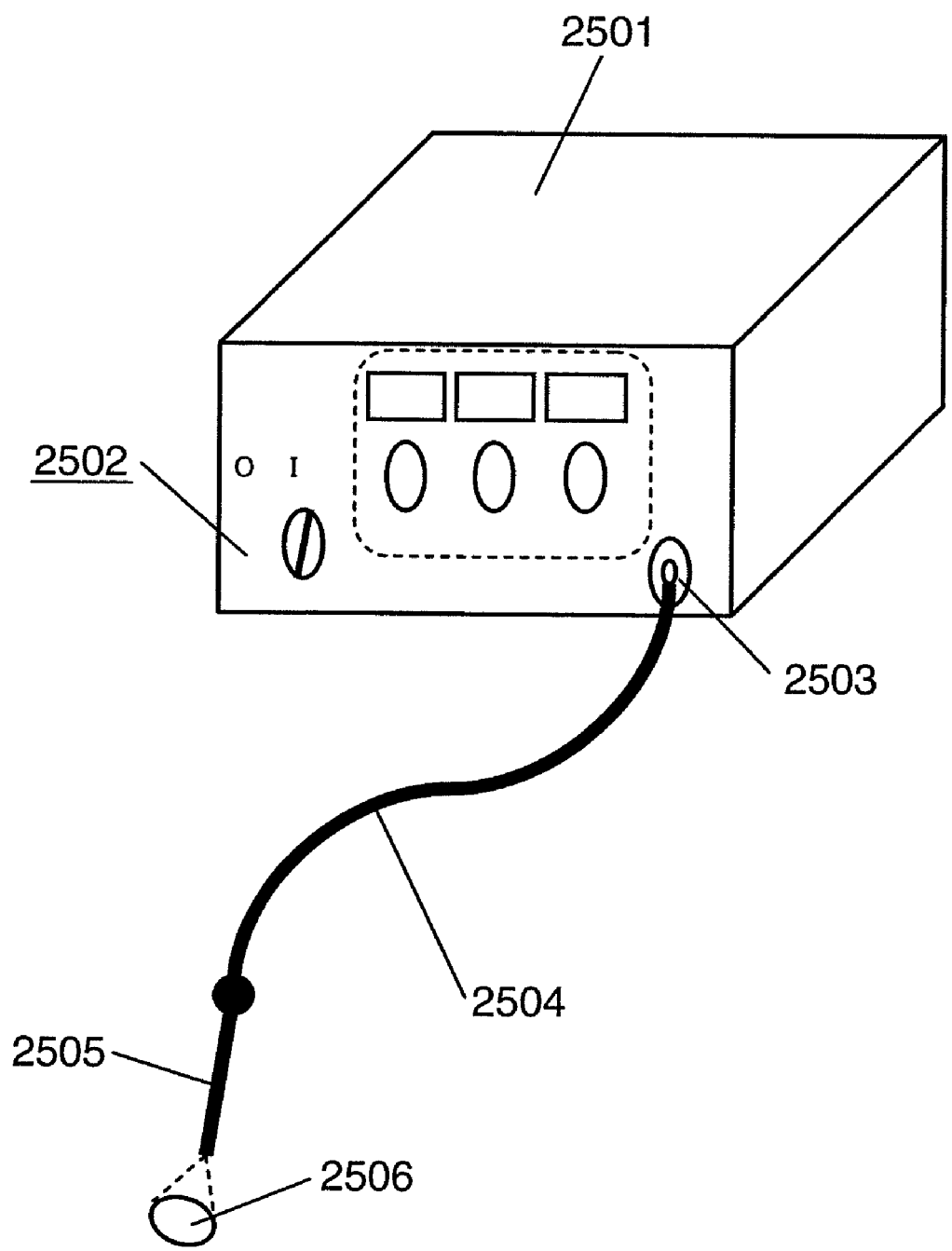
FIG. 25 is an explanatory view schematically showing an example structure of a laser light source provided with fiber adopting the laser light source of the present invention.

As shown FIG. 25, the laser device of the present invention may be used as a laser light source 2500 for surgical operations, which is made up of, for example, a laser light source, a control unit for controlling the output from the laser light source, an output setting device 2502 for setting an output level, an output connector 2503 for outputting a laser from a laser light source, a delivery fiber 205 for guiding the laser beam to a desired area to be irradiated with, and a hand peace 2505, etc.

Using the small beam diameter region with an output range of 1.6 W to 3 W as shown in the graph of FIG. 18A, it is possible to excite the second harmonic wave by optically connecting to the delivery fiber 2504 by changing the NA according to needs. Specifically, in the case where only the output of low level is required, but the spatial uniformity of the laser beam 2506 as emitted from the delivery fiber 2504 is required, the NA is set to be large (NA: 0.12 in the case of the present embodiment). On the other hand, in the case where the output of high level is required, but the uniformity is not required, the NA is set to be small (NA: 0.09 in the case of the present embodiment).

Figure 26A:
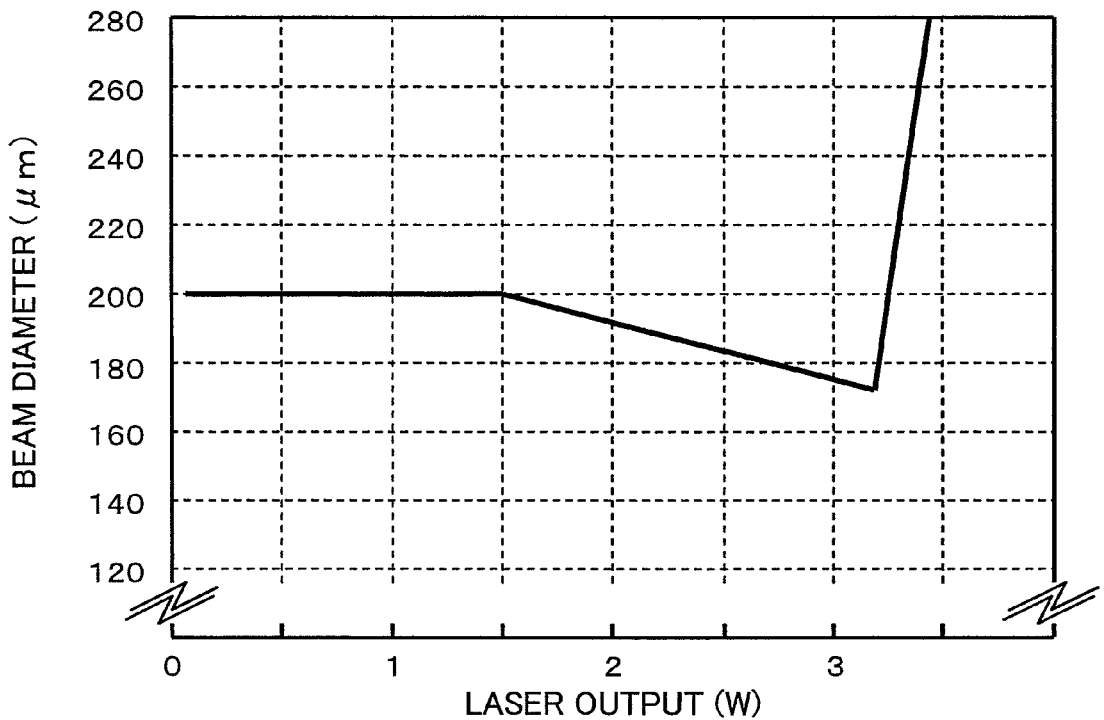
FIG. 26A is a graph showing the relationship between a light intensity and a beam diameter directly before being connected to a transmission-use fiber when adopting a beam diameter change mechanism of FIG. 25.
Figure 26B:
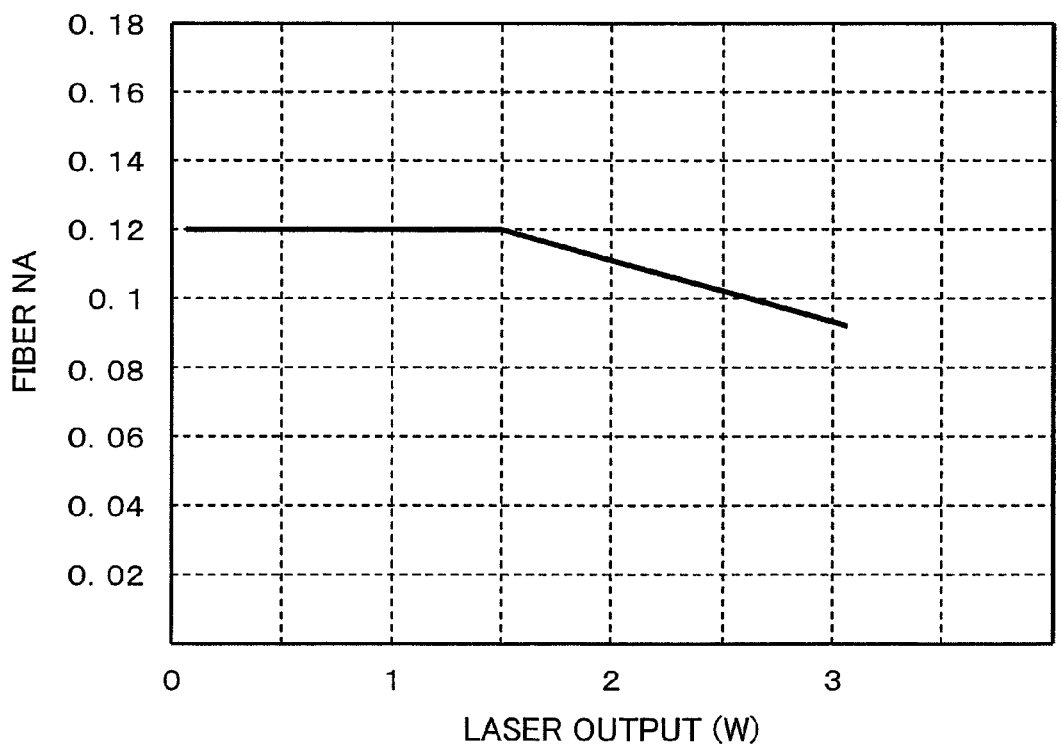
FIG. 26B is a graph showing the relationship between a light intensity and a transmission-use fiber NA when adopting a beam diameter change mechanism of FIG. 25.

FIG. 26A is a graph showing the relationship between the light intensity and the beam diameter directly before being connected to a transmission-use fiber of the laser light source with fiber as shown in FIG. 25. FIG. 26B is a graph showing the relationship between a light intensity and a transmission-use fiber NA of a laser beam to be incident into the delivery fiber 2504. As can be seen from the graphs of FIG. 26A and FIG. 26B, the NA to the delivery fiber 2504 becomes smaller as the beam diameter becomes smaller according to the output level.

According to the foregoing structures of the present invention, the following problems when adopting the wavelength conversion element having the light absorption properties can be prevented. That is, the auto power control: APC cannot be performed as the output level is not raised in response to an increase in input power of the fundamental wave, or it becomes not possible to adjust changes in phase matching temperature of the wavelength conversion element as time passes. As described, since such problem that the output level becomes out of control can be prevented, an improved reliability of the apparatus can be ensured, thereby realizing the wavelength conversion laser light source for displays suited for consumer products, etc.

As described, a wavelength conversion laser light source, according to one aspect of the present invention includes: a fundamental wave laser light source; a wavelength conversion element for converting a fundamental wave emitted from the fundamental wave laser light source into a harmonic wave, the wavelength conversion element being made of a material whose light absorption properties change according to an output level of a harmonic wave; an output setting section for setting a harmonic wave output power level; and an element temperature switching section that switches a temperature of the wavelength conversion element according to a harmonic wave output level as set in the output setting device, wherein the element temperature switch section includes an element temperature holding section which holds the wavelength conversion element at the temperature as switched by the element temperature switching section.

According to the foregoing structure wherein the wavelength conversion element made of a material whose light absorption properties change according to an output level of a harmonic wave, the phase matching temperature of the wavelength conversion element changes according to an output level of the harmonic wave. In response to changes in phase matching temperature of the wavelength conversion element according to the output level of the harmonic wave, the element temperature switching section switches the element temperature of the wavelength conversion element according to the output level of the harmonic wave, and the element temperature holding section holds the wavelength conversion element at the element temperature as switched. As a result, it is possible to realize the wavelength conversion laser light source, which permits an efficient conversion without being adversely affected by changes in phase matching condition of the wavelength conversion element according to the output level of the harmonic wave.

Furthermore, the wavelength conversion element can be maintained at a desirable temperature corresponding to the output level of the harmonic wave, thereby realizing a high wavelength conversion efficiently.

With the foregoing structure, it is preferable that the element temperature holding section includes a memory for storing therein element temperatures to be held by the element temperature holding section.

With the foregoing structure, it is preferable that the element temperature holding section includes a temperature adjusting member capable of adjusting the temperature of the wavelength conversion element by heating or cooling the wavelength conversion element, an element temperature detector which detects the temperature of the wavelength conversion element, and a temperature controller which controls the temperature of the wavelength conversion element by controlling the temperature adjusting member, wherein the temperature controller controls the temperature adjusting member, to set a present temperature of the element temperature detector to the temperature as switched by the element section.

According to the foregoing structure, since the temperature controller controls the temperature adjusting member based on the element temperature detected by the element temperature detector, the wavelength conversion element can be maintained at a desirable temperature according to the output level of the harmonic wave.

With the foregoing structure, it is preferable that the memory stores a driving current for the harmonic wave laser light source corresponding to a harmonic wave output power level.

According to the foregoing structure, the harmonic wave of the desired output level can be obtained with ease based on the driving current for the fundamental wave laser light source stored in the memory.

With the foregoing structure, it is preferable that an element temperature learning section be further provided for learning a temperature of the wavelength conversion element as stored in the memory, to rewrite the currently stored temperature into a temperature as learned, wherein the element temperature learning section searches for an optimal element temperature at which a harmonic wave of the highest power can be outputted, with a start temperature for the search of a predetermined temperature $\Delta t(°C.)$ below the temperature of the wavelength conversion element as stored in the memory, and the element temperature learning section carries out the search by increasing the temperature from the start temperature, and stores in the memory the optimal temperature as searched.

According to the foregoing structure, the element temperature learning section carries out the learning by a peak search for a maximum harmonic wave output value while changing the temperature of the wavelength conversion element. The element temperature learning section then determines a temperature, at which a harmonic wave of the highest power can be outputted, as an optimal temperature corresponding to the harmonic wave output value. With this structure, even when the optimal temperature of the wavelength conversion element corresponding to the harmonic wave output value changes from that stored in the memory due to the deterioration of the wavelength conversion element as time passes, an optimal temperature obtained by carrying out the learning can be stored to be replaced with the currently stored temperature. As a result, it is possible to perform the frequency conversion at high efficiency over a long period of time.

With the foregoing structure, it is preferable that an element temperature learning section be provided for learning a temperature of the wavelength conversion element as stored in the memory, to rewrite the currently stored temperature into a temperature as learned, wherein the element temperature learning section searches for an optimal element temperature at which a harmonic wave of the highest power can be outputted, with a start temperature for the search of a predetermined temperature Δt(° C.) below the temperature of the wavelength conversion element as stored in the memory, and the element temperature learning section carries out the search by increasing the temperature from the start temperature, and stores in the memory a temperature lower than the optimal temperature as searched.

According to the foregoing structure, as a result of learning, the lower temperature than that obtained by the learning processes is stored in the memory to be replaced with the currently stored temperature. It is therefore possible to prevent such problem that the output level of the harmonic wave cannot be increased with an increase in the input level of the fundamental wave. This can be seen from the tuning curve in the graph of FIG. 4, which is shifted to the lower temperature side with respect to the fundamental wave input.

With the foregoing structure, it is preferable that the predetermined temperature Δt(° C.) is in a range of 0.5 to 1 times of a tolerance range for a temperature ΔT(° C.) of the wavelength conversion element.

According to the foregoing structure, when carrying out the peak search for the highest output level of the harmonic wave while changing the temperature of the wavelength conversion element, a misreading of the sub-peak in the temperature tuning curve of the harmonic wave output as the peak can be prevented.

With the foregoing structure, it is preferable that the element temperature learning section includes: a current monitoring section which monitors a driving current value of the fundamental wave laser light source; and a learning timing determining section which determines a start timing of the temperature learning processes; the learning timing determining section determines that the temperature learning processes are to be started when the following equation holds:

$$I_1 \times (1+d/100) = I_{lim}$$

wherein $I_1$ indicates a driving current value of the fundamental wave laser light source required for obtaining a harmonic power of an output power value set in the output setting device, $I_{lim}$ indicates a driving current limit value for the fundamental wave laser light source, and d (%) indicates a coefficient.

According to the foregoing structure, it is possible to determine an appropriate timing for executing the temperature learning processes based on that the driving current value of the fundamental wave laser light source becomes closer to the limit value of the driving current for the fundamental wave laser light source.

With the foregoing structure, it is preferable that the memory stores a reference element temperature when a reference fundamental wave emitted from the fundamental wave laser light source is injected, and an amount of shift in temperature from the reference element temperature corresponding to the fundamental wave that is different from the reference fundamental wave, and the element temperature switch section switches a temperature of the wavelength conversion element to a temperature as computed based on a shift in temperature corresponding to the required fundamental wave for obtaining the harmonic wave of the output level set in the output setting section.

According to the foregoing structure, it is possible to shift the temperature of the wavelength conversion element to an appropriate temperature by computing the necessary element temperature for obtaining the harmonic wave of the output level as set in the output setting device based on a shift in temperature from the reference element temperature.

With the foregoing structure, it is preferable that an element temperature fine adjustment section be further provided that makes a fine adjustment on the temperature of the wavelength conversion element in a state where a rectangular pulse beam is outputted from the wavelength laser light source, wherein the element temperature fine adjustment section adjusts the element temperature so as to match a waveform of a current pulse for use in driving the fundamental wave light source with a waveform of the harmonic wave output as a result of comparison between these waveforms.

According to the foregoing structure, a rectangular pulse is outputted from the wavelength conversion laser light source. Here, as shown in FIG. 16A, when the temperature of the wavelength conversion element is lower than the phase matching temperature, the output waveform is lacked at the beginning (at a rise) of the output waveform of the harmonic wave.

On the other hand, as shown in FIG. 16C, when the temperature of the wavelength conversion element is higher than the phase matching temperature, the output waveform is lacked at the end (at a fall) of the output waveform of the harmonic wave. In the phase matching state, the current pulse waveform is matched with the waveform of the harmonic wave actually outputted. As described, by comparing the waveform of the current pulse with the waveform of the harmonic wave output by the element temperature fine adjustment section, it can be observed to which direction (lower temperature side or higher temperature side), the temperature of the wavelength conversion element is shifted from the phase matching temperature. Therefore, by carrying out a fine adjustment on the element temperature by the element temperature fine adjustment section so that the current pulse waveform is matched with the output waveform of the harmonic wave, it is possible to appropriately set the temperature of the wavelength conversion element to the phase matching temperature.

With the foregoing structure, it is preferable that the harmonic wave resulting from the wavelength conversion by the wavelength conversion element has a wavelength which is less than 2 times of a wavelength of an absorption edge of nonlinear optical crystals of the wavelength conversion element.

The foregoing conditions are appropriate conditions for the wavelength conversion element made of a material whose light absorption properties vary according to the output level of the harmonic wave.

With the foregoing structure, it is preferable that the nonlinear optical crystals of the wavelength conversion element is LN:lithium niobate (including those having magnesium oxide added), lithium tantalate (including those having magnesium oxide added), $KTiOPO_4$ (KTP:Potassium Titanyl Phosphate), and the wavelength conversion element emits a green light having a wavelength in a range of from 520 nm to 560 nm as a result from the wavelength conversion.

With the foregoing structure, it is preferable that the wavelength conversion element has a beam diameter variable structure for varying a beam diameter of a harmonic wave outputted from the wavelength conversion element, the wavelength conversion laser light source further including a beam shape abnormality detection mechanism for detecting an abnormality in beam shape of the harmonic wave outputted from the wavelength conversion element.

According to the foregoing structure, the wavelength conversion element has a beam diameter variable structure for varying a beam diameter of a harmonic wave, it is possible to detect an abnormality in the beam shape of the harmonic wave by the beam shape abnormality detection mechanism.

With the foregoing structure, it is preferable that the beam shape abnormality detection mechanism includes a photoreceptor which monitors an intensity of the harmonic wave outputted from the wavelength conversion element; and the photoreceptor includes a beam diameter detection mechanism for detecting an abnormality in beam diameter of the harmonic wave outputted from the wavelength conversion element.

With the foregoing structure, it is preferable that the wavelength conversion element having the beam diameter variable structure is MgO:LiNbO$_3$ having a periodical polarization inversion structure; and the harmonic wave has an output power of not higher than 3 W. In the case of adopting the MgO:LiNbO$_3$, the beam becomes in a doughnut shape, and the harmonic wave output becomes unstable at a point the output of the second harmonic wave exceeding 3 W. However, in the output range of not higher than 3 W of the harmonic wave, an abnormality in beam shape does not occur.

With the foregoing structure, it is preferable that the wavelength conversion element having the beam diameter variable structure is a MgO:LiTaO$_3$ crystal element having a periodical polarization inversion structure; and the harmonic wave has an output power of less than 6.5 W. In the case of adopting the MgO:LiTaO$_3$, in the output range of not larger than 6.5 W of the harmonic wave, an abnormality in beam shape does not occur.

With the foregoing structure, it is preferable that the beam diameter detection mechanism includes a photodiode divided into segments.

According to the foregoing structure, by the photodiode divided into segments, it is possible to detect an abnormality in beam shape (doughnut shape) of the harmonic wave output.

With the foregoing structure, it is preferable that the the beam diameter detection mechanism is divided into two segments A and B; and the beam shape abnormality detection mechanism determines that an abnormality occurs in beam diameter of harmonic wave when satisfying the condition of:

$$d \times LA < LB (0 < d < 0.5),$$

wherein a segment A is a segment to be irradiated with the harmonic wave in a normal state, a segment B is a segment to be irradiated with the harmonic wave in an abnormal state, LA is an amount of the harmonic wave irradiated in the segment A, and LB is an amount of the harmonic wave irradiated in the segment B.

According to the foregoing structure, in an event that an abnormality in beam shape (doughnut shape) of the harmonic wave output occurs, the amount of harmonic wave received by the segment B would increase and the above condition is satisfied. It is therefore possible to accurately detect an occurrence of an abnormality in beam shape (beam diameter).

A wavelength conversion laser light source according to another aspect of the present invention includes: a fundamental wave laser light source; a wavelength conversion element for converting a fundamental wave emitted from the fundamental wave laser light source into a harmonic wave, the wavelength conversion element being made of a material whose light absorption properties are subjected to change according to an output level of a harmonic wave; an output setting section for setting a harmonic wave output power level; and an element temperature holding section which holds the wavelength conversion element at an optimal temperature set for a harmonic wave output power level corresponding to 110% to 120% of an upper limit of the output power level that can be set in the output setting device.

According to the foregoing structure, in an entire output range for the harmonic wave that can be set, such input/output characteristics that the harmonic wave output increases monotonically with an increase in the fundamental wave input can be achieved. Namely, it is possible to control the harmonic wave output with a current value applied to the wavelength conversion laser light source.

With the foregoing structure, it is preferable that the element temperature holding section includes a memory for storing therein element temperatures to be held by the element temperature holding section.

With the foregoing structure, it is preferable that the an element temperature learning section be provided for learning a temperature of the wavelength conversion element as stored in the memory, to rewrite the currently stored temperature into a temperature as learned; and the element temperature learning section which searches for an optimal element temperature at which a harmonic wave of the highest power can be outputted, with a start temperature for the search, a predetermined temperature $\Delta t(^\circ C.)$ below the temperature of the wavelength conversion element as stored in the memory, wherein the element temperature learning section carries out the search by increasing the temperature from the start temperature, and stores in the memory the optimal temperature as searched.

According to the foregoing structure, the element temperature learning section carries out the learning by a peak search for a maximum harmonic wave output value while changing the temperature of the wavelength conversion element. The element temperature learning section then determines a temperature, at which a harmonic wave of the highest power can be outputted, as an optimal temperature corresponding to the harmonic wave output value. With this structure, even when the optimal temperature of the wavelength conversion element corresponding to the harmonic wave output value changes from that stored in the memory due to the deterioration of the wavelength conversion element as time passes, an optimal temperature obtained by carrying out the learning can be stored to be replaced with the currently stored temperature. As a result, it is possible to perform the frequency conversion at high efficiency over a long period of time.

A two-dimensional image display device in accordance with still another aspect of the present invention includes: a wavelength conversion laser light source of any of the foregoing structure, a two-dimensional modulation element that two-dimensionally modulates an output beam from the wavelength conversion laser light source; and a projection lens that projects the output beam from the two-dimensional modulation element.

According to the foregoing structure, it is possible to realize the two-dimensional image display device adopting the wavelength conversion laser light source which permits a wavelength conversion with high efficiency even when a phase matching temperature of the wavelength conversion element changes according to the output level of the harmonic wave.

A two-dimensional image display device, in accordance with still another aspect of the preset invention includes: the light source unit including the wavelength conversion laser light source having any of the foregoing structures; and a liquid crystal panel which emits the output beam from the light source unit.

According to the foregoing structure, it is possible to realize the two-dimensional image display device adopting the wavelength conversion laser light source which permits a wavelength conversion with high efficiency even when a phase matching temperature of the wavelength conversion element changes according to the output level of the harmonic wave.

A laser light source device, in accordance with still another aspect of the preset invention includes: the wavelength conversion laser light source having any of the foregoing structure; and a fiber for guiding the harmonic wave outputted from the wavelength conversion laser light source to an irradiation area.

According to the foregoing structure, it is possible to realize the laser light source device which permits a wavelength conversion with high efficiency even when a phase matching temperature of the wavelength conversion element changes according to the output level of the harmonic wave.

A temperature setting method of a wavelength conversion element in accordance with still another aspect of the present invention, which is made of a material whose light absorption properties are subjected to change according to an output power of a harmonic wave resulting from converting the wavelength of a fundamental wave includes the steps of: setting a harmonic wave output level; and switching a temperature of the wavelength conversion element according to an output level of the harmonic wave.

According to the foregoing method, it is possible to realize a wavelength conversion with high efficiency even when a phase matching temperature of the wavelength conversion element changes according to the output level of the harmonic wave.

A temperature setting method of a wavelength conversion element in accordance with still another aspect of the present invention, which is made of a material whose light absorption properties are subjected to change according to an output power of a harmonic wave resulting from converting the wavelength of a fundamental wave, includes the steps of: setting a harmonic wave output level; and setting an optimal temperature of the wavelength conversion element to a temperature at which a harmonic wave of an output level of 110% to 120% of an upper limit of the output level that can be set in the output setting device.

According to the foregoing method, it is possible to realize a wavelength conversion with high efficiency even when a phase matching temperature of the wavelength conversion element changes according to the output level of the harmonic wave.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wavelength conversion laser light source comprising:
a fundamental wave laser light source;
a wavelength conversion element for converting a fundamental wave emitted from the fundamental wave laser light source into a harmonic wave, the wavelength conversion element being made of a material whose light absorption properties are subjected to change according to an output level of a harmonic wave;
an output setting section for setting a harmonic wave output power value;
an element temperature switching section that switches a temperature of the wavelength conversion element to a temperature according to a harmonic wave output level as set in the output setting section, and includes an element temperature holding section that holds said wavelength conversion element at the temperature as switched by said element temperature switching section, said element temperature holding section including a memory for storing therein element temperatures to be held by said element temperature holding section; and
an element temperature learning section for learning a temperature of said wavelength conversion element as stored in said memory, to rewrite the currently stored temperature into a temperature as learned, wherein:
said element temperature learning section searches for an optimal element temperature at which a harmonic wave of the highest power can be outputted, with a start temperature for said search of a predetermined temperature $\Delta t(° C.)$ below the temperature of said wavelength conversion element as stored in said memory, and
said element temperature learning section carries out said search by increasing the temperature from said start temperature, and stores in said memory the optimal temperature as searched.

2. The wavelength conversion laser light source according to claim 1, wherein:
said element temperature holding section includes a temperature adjusting member capable of adjusting the temperature of said wavelength conversion element by heating or cooling said wavelength conversion element, and an element temperature detector that detects the temperature of said wavelength conversion element, and a temperature controller that controls the temperature of the wavelength conversion element by controlling the temperature adjusting member, and
said temperature controller controls said temperature adjusting member, to set a present temperature of said element temperature detector to the temperature switched by said element temperature switching section.

3. The wavelength conversion laser light source according to claim 1, wherein:
said memory stores a driving current for said harmonic wave laser light source corresponding to a harmonic wave output power value.

4. The wavelength conversion laser light source according to claim 1, wherein:
the harmonic wave resulting from the wavelength conversion by said wavelength conversion element has a wavelength which is less than 2 times of a wavelength of an absorption edge of nonlinear optical crystals of said wavelength conversion element.

5. The wavelength conversion laser light source according to claim 4, wherein:
said nonlinear optical crystals of said wavelength conversion element is LN: lithium niobate (including those having magnesium oxide added), lithium tantalate (including those having magnesium oxide added), $KTiOPO_4$ (KTP: Potassium Titanyl Phosphate), and
said wavelength conversion element emits a green light having a wavelength in a range of from 520 nm to 560 nm as a result from said wavelength conversion.

6. A laser light source device, comprising:
said wavelength conversion laser light source of claim 1; and
a fiber for guiding the harmonic wave outputted from said wavelength conversion laser light source to an irradiation area.

7. A wavelength conversion laser light source comprising:
a fundamental wave laser light source;
a wavelength conversion element for converting a fundamental wave emitted from the fundamental wave laser light source into a harmonic wave, the wavelength conversion element being made of a material whose light absorption properties are subjected to change according to an output level of a harmonic wave;
an output setting section for setting a harmonic wave output power value;

an element temperature switching section that switches a temperature of the wavelength conversion element to a temperature according to a harmonic wave output level as set in the output setting section, and includes an element temperature holding section that holds said wavelength conversion element at the temperature as switched by said element temperature switching section, said element temperature holding section including a memory for storing therein element temperatures to be held by said element temperature holding section; and an element temperature learning section for learning a temperature of said wavelength conversion element as stored in said memory, to rewrite the currently stored temperature into a temperature as learned, wherein:

said element temperature learning section searches for an optimal element temperature at which a harmonic wave of the highest power can be outputted, with a start temperature for said search of a predetermined temperature $\Delta t(°C.)$ below the temperature of said wavelength conversion element as stored in said memory, and said element temperature learning section carries out said search by increasing the temperature from said start temperature, and stores in said memory a temperature lower than said optimal temperature as searched.

8. The wavelength conversion laser light source according to claim 7, wherein:

said predetermined temperature $\Delta t(°C.)$ is in a range of 0.5 to 1 times of a tolerance range for a temperature $\Delta T(°C.)$ of the wavelength conversion element.

9. The wavelength conversion laser light source according to claim 7, wherein:

said element temperature learning section includes:

a current monitoring section that monitors a driving current value of said fundamental wave laser light source; and a learning timing determining section that determines a start timing of said temperature learning processes, wherein said learning timing determining section determines that said temperature learning processes are to be started when the following equation holds:

$$I_1 \times (1+d/100) = I_{lim}$$

wherein $I_1$ indicates a driving current value of said fundamental wave laser light source required for obtaining a harmonic power of an output power value set in said output setting device, $I_{lim}$ indicates a driving current limit value for said fundamental wave laser light source, and $d(\%)$ indicates a coefficient.

* * * * *